US012797747B2

(12) United States Patent
Pan et al.

(10) Patent No.: US 12,797,747 B2
(45) Date of Patent: Nov. 17, 2026

(54) LOADING NON-PLAYER CHARACTERS IN CURRENT RANGE

(71) Applicant: Tencent Technology (Shenzhen) Company Limited, Shenzhen (CN)

(72) Inventors: Yong Pan, Shenzhen (CN); Longwei Lai, Shenzhen (CN); Yachang Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 153 days.

(21) Appl. No.: 18/673,154

(22) Filed: May 23, 2024

(65) Prior Publication Data

US 2024/0316463 A1 Sep. 26, 2024

Related U.S. Application Data

(63) Continuation of application No. PCT/CN2023/111425, filed on Aug. 7, 2023.

(30) Foreign Application Priority Data

Sep. 8, 2022 (CN) ........................ 202211093802.2

(51) Int. Cl.
*A63F 13/69* (2014.01)

(52) U.S. Cl.
CPC .................................... *A63F 13/69* (2014.09)

(58) Field of Classification Search
CPC ........ A63F 13/69; A63F 13/35; A63F 13/426; A63F 13/52; A63F 13/56; A63F 13/822;
(Continued)

(56) References Cited

U.S. PATENT DOCUMENTS

2010/0273544 A1* 10/2010 Koganezawa ...... A63F 13/5375 463/2
2012/0176366 A1* 7/2012 Genova ................ G06T 15/205 345/419
(Continued)

FOREIGN PATENT DOCUMENTS

CN 102693363 A 9/2012
CN 102819680 A 12/2012
(Continued)

OTHER PUBLICATIONS

International Search Report and Written Opinion received for PCT Patent Application No. PCT/CN2023/111425, mailed on Oct. 23, 2023, 13 pages (5 pages of English Translation and 8 pages of Original copy attached).
(Continued)

*Primary Examiner* — Michael A Cuff
(74) *Attorney, Agent, or Firm* — ArentFox Schiff LLP

(57) ABSTRACT

In a data processing method, a query distance range is determined based on current position information of a character controlled by a user in a virtual scene. Data for a plurality of non-player characters (NPCs) from a database is determined based on NPCs to be placed in the query distance range. The data includes a plurality of attributes respectively corresponding to each of the plurality of the NPCs. Weights are determined for each of the plurality of NPCs. A first number of NPCs is generated based on a descending order of the weights for each of the plurality of NPCs. The first number of NPCs is a subset of the plurality of NPCs. The generated first number of NPCs are transmitted to a client controlling the player-controlled character to cause the client to display, in the query distance range, virtual images corresponding to the first number of NPCs.

20 Claims, 9 Drawing Sheets

(58) Field of Classification Search
CPC ......... A63F 2300/308; A63F 2300/807; Y02D 10/00
USPC .......................................................... 463/31
See application file for complete search history.

(56) References Cited

U.S. PATENT DOCUMENTS

| | | | | |
|---|---|---|---|---|
| 2018/0256977 A1* | 9/2018 | Wakasono | A63F 13/54 | |
| 2021/0031106 A1* | 2/2021 | Alderman | A63F 13/35 | |
| 2022/0309364 A1* | 9/2022 | Perry | A63F 13/56 | |
| 2023/0310995 A1* | 10/2023 | Saeedi | A63F 13/67 | 463/43 |

FOREIGN PATENT DOCUMENTS

| | | | |
|---|---|---|---|
| CN | 109499059 A | | 3/2019 |
| CN | 113457147 A | | 10/2021 |
| CN | 113713388 A | | 11/2021 |
| JP | 6114848 B1 | * | 4/2017 |

OTHER PUBLICATIONS

Office Action received for Chinese Patent Application No. 202211093802.2, mailed on Jul. 23, 2026, 22 pages (11 pages of English Translation and 11 pages of Original Document).

* cited by examiner

LOADING NON-PLAYER CHARACTERS IN CURRENT RANGE

RELATED APPLICATIONS

The present application is a continuation of International Application No. PCT/CN2023/111425, "DATA PROCESSING METHOD AND APPARATUS FOR VIRTUAL SCENE, ELECTRONIC DEVICE, AND COMPUTER STORAGE MEDIUM," filed on Aug. 7, 2023, which claims priority to Chinese Patent Application No. 202211093802.2, filed on Sep. 8, 2022. The entire disclosures of the prior applications are hereby incorporated by reference.

FIELD OF THE TECHNOLOGY

This application relates to the field of Internet technologies, including a data processing method.

BACKGROUND OF THE DISCLOSURE

In the related art, all NPC basic data in a game is created and managed without any reservation. For example, an NPC is instantiated as soon as basic data of the NPC is obtained. However, a player-controlled character is always limited to a very small range in a game map in a game process. Therefore, the player-controlled character does not interact with most NPCs at the moment. In this case, if a corresponding entity object is instantiated and created in real time for each piece of NPC basic data, high resource overhead is inevitably caused on a server and a terminal device.

SUMMARY

Embodiments of this disclosure include e a data processing method, apparatus and a non-transitory computer-readable storage medium.

Examples of technical solutions in the embodiments of this disclosure may be implemented as follows:

An aspect of this disclosure provides a data processing method, performed by an electronic device, for example, in a data processing method, a query distance range is determined based on current position information of a character controlled by a user in a virtual scene. Data for a plurality of non-player characters (NPCs) from a database is determined based on NPCs to be placed in the query distance range. The data includes a plurality of attributes respectively corresponding to each of the plurality of the NPCs. Weights are determined for each of the plurality of NPCs. A first number of NPCs is generated based on a descending order of the weights for each of the plurality of NPCs. The first number of NPCs is a subset of the plurality of NPCs. The generated first number of NPCs are transmitted to a client controlling the player-controlled character to cause the client to display, in the query distance range, virtual images corresponding to the first number of NPCs.

An aspect of this disclosure provides a data processing apparatus, including processing circuitry. The processing circuitry is configured to determine a query distance range based on current position information of a character controlled by a user in a virtual scene. The processing circuitry is configured to determine data for a plurality of non-player characters (NPCs) from a database based on NPCs to be placed in the query distance range. The data includes a plurality of attributes respectively corresponding to each of the plurality of the NPCs. The processing circuitry is configured to determine weights for each of the plurality of NPCs. The processing circuitry is configured to generate a first number of NPCs based on a descending order of the weights for each of the plurality of NPCs. The first number of NPCs is a subset of the plurality of NPCs. The processing circuitry is configured to transmit the generated first number of NPCs to a client controlling the player-controlled character, to cause the client to display, in the query distance range, virtual images corresponding to the first number of NPCs.

An aspect of this disclosure provides a non-transitory computer-readable storage medium storing instructions which when executed by a processor cause the processor to perform any of the methods of this disclosure.

The embodiments of this disclosure have the following beneficial effects:

A part of NPCs, namely, the first number of NPCs, are screened, according to the weights of the plurality of NPCs, from the plurality of NPCs to be generated in the current query range. The instantiation processing is then performed on the screened first number of NPCs, and the first number of entity objects are transmitted to the client. The first number of NPCs are screened in a weight descending order, which ensures that important NPCs in the current query range are not omitted. Based on data of the NPCs in the current query range, necessary interaction with the player can be performed, ensuring completeness of game experience of the player. In addition, because a part of unimportant NPCs are filtered out, it is unnecessary to maintain data of all NPCs in the server. Therefore, the resource overhead of the server and the terminal device can be reduced, and because the terminal only needs to load data of a part of NPCs, a loading speed of the virtual scene is accelerated.

DESCRIPTION OF EMBODIMENTS

Figure 1:
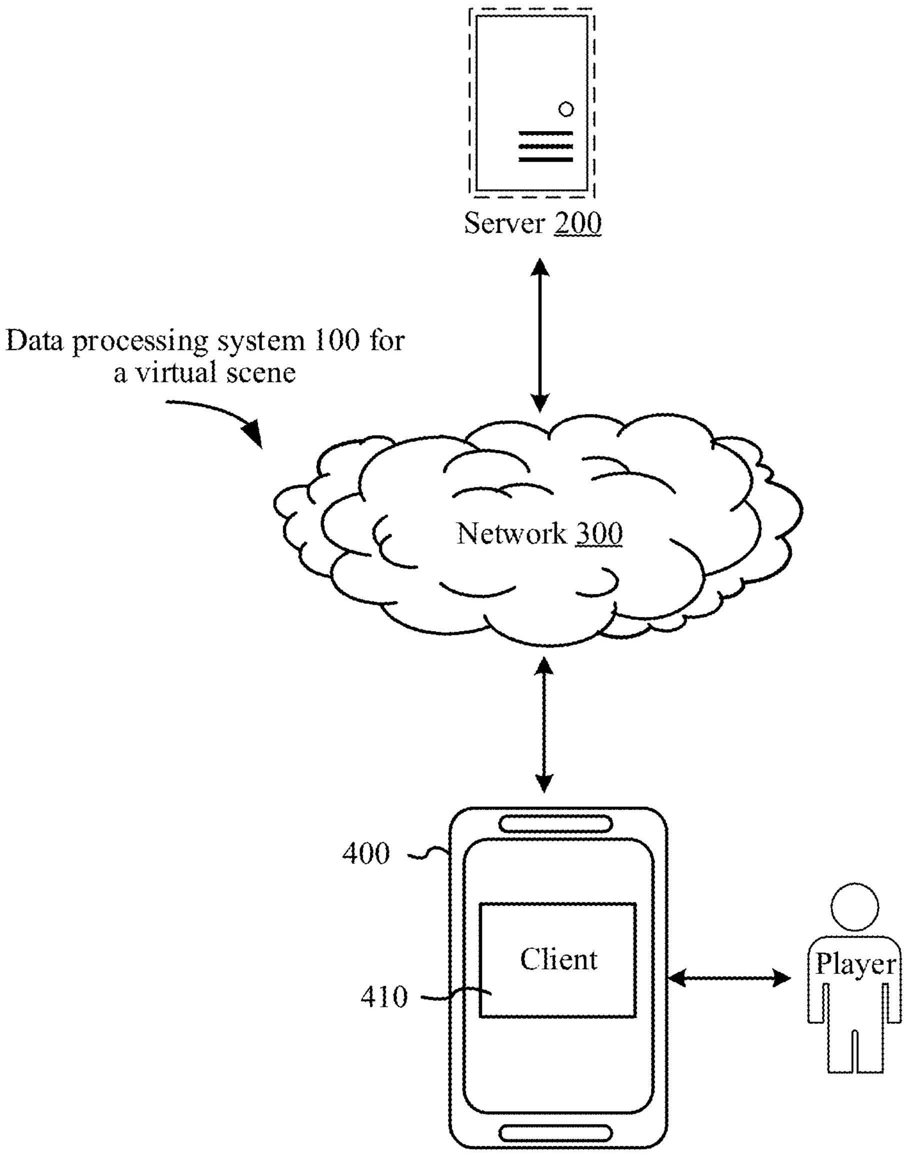
FIG. 1 is a schematic architectural diagram of a data processing system 100 for a virtual scene according to an embodiment.

The objectives, technical solutions, and advantages in embodiments of this disclosure are described in further detail with reference to the accompanying drawings. The described embodiments are some of the embodiments of this disclosure rather than all of the embodiments. Other embodiments are within the scope of this disclosure.

In the following descriptions, related "some embodiments" describe a subset of all possible embodiments. However, the "some embodiments" may be the same subset or different subsets of all the possible embodiments, and may be combined with each other without conflict.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices. In the following descriptions, the involved term "first/second/ . . . " is merely intended to distinguish similar objects but does not necessarily indicate a specific order of an object. The "first/second" is interchangeable in terms of a specific order or sequence if permitted, so that the embodiments of this disclosure described herein can be implemented in a sequence in addition to the sequence shown or described herein.

Unless otherwise defined, meanings of all technical and scientific terms used in this specification are the same as those usually understood by a person skilled in the art to which this disclosure belongs. Terms used in this specification are merely intended to describe objectives of the embodiments of this disclosure, but are not intended to limit this disclosure.

Before the embodiments of this disclosure are further described in detail, terms involved in the embodiments of this disclosure are described. The terms involved in the embodiments of this disclosure are applicable to the following explanations.

(1) In response to: It indicates a condition or status on which an operation to be performed depends. When the condition or status is satisfied, one or more operations to be performed may be real-time or have a set delay. Unless explicitly stated, there is no limitation on the order in which the plurality of operations are performed.

(2) Virtual scene: It is a virtual scene displayed (or provided) when an application program is run on a terminal. The virtual scene may be a simulated environment of a real world, or may be a semi-simulated semi-fictional virtual environment, or may be an entirely fictional virtual environment. The virtual scene may be any one of a two-dimensional virtual scene, a 2.5-dimensional virtual scene, or a three-dimensional virtual scene, and the dimension of the virtual scene is not limited in the embodiments of this disclosure. For example, the virtual scene may include the sky, the land, the ocean, or the like. The land may include environmental elements such as the desert and a city. A player may control a player-controlled character to move in the virtual scene.

(3) Player-controlled character (PCC): It refers to a character controlled by the player in a game. The player-controlled character may be a virtual image used for representing the player in the virtual scene, for example, a virtual character, a virtual animal, or a cartoon character. The player-controlled character has a shape and a volume in the virtual scene, and occupies some space of the virtual scene.

(4) Non-player character (NPC): It refers to a character not controlled by the player in the game. The NPC is controlled by artificial intelligence of a computer, and is a character that has a behavior mode. NPCs may be classified into plot NPCs, combat NPCs, service NPCs, and the like. Sometimes there are NPCs with multiple functions. The plot NPCs and the service NPCs are usually not attackable objects, or are attackable objects but do not actively attack. In addition, some NPCs drop items that can provide the player with some information about the game or trigger the plot.

(5) Generation rule: It is, namely, an NPC generation rule. It includes conditions (including a trigger condition and a rule execution condition) that need to be met for an NPC to appear in the game (for example, an open-world game) and a type of an NPC that needs to be generated when the condition is met. The trigger condition may include attributes such as time and a level of the player-controlled character, and the rule execution condition includes attributes such as a position and weather. Configured data formed by extracting and abstracting these attributes is the NPC generation rule. Types of NPC generation rules may include a static generation rule and a dynamic generation rule. The static generation rules are generation rules of an NPC (for example, a guide NPC) with a fixed attribute, and the dynamic generation rules are generation rules of an NPC (for example, the combat NPC) with a dynamically changing attribute. For example, an attack power of the combat NPC increases as the level of the player-controlled character increases.

(6) Basic data: It is, namely, NPC basic data. It is attributes of multiple dimensions of an NPC obtained through extraction from the NPC generation rule, for example, including a type, a level, a position, an attack power, and appearance. NPC entity objects for games can be created according to the attributes.

(7) Instantiation processing: It refers to that a server allocates a storage area in an internal memory space, and then generates entity objects corresponding to a specific number of NPCs in the storage area. A capacity of the storage area is positively correlated to a number of NPCs on which instantiation processing needs to be performed. Variables of various attributes in the entity objects are stored in the storage area.

(8) Area of interest (AOI): Similar to a visual range of how far humans can see in the real world, it refers to a region that the player-controlled character sees in real time in the virtual scene. The AOI changes as the player-controlled character moves. In a broad sense, an AOI system supports an individual object in any game world in processing events that occur within a range of a specific radius. However, in most cases, the AOI system only focuses on an object leaving or entering event that occurs within a range of a field of view radius of the player-controlled character.

(9) Open-world game: It is also referred to as a free roam game, which is a type of game level design. The player may freely roam in a virtual world, and can freely select a time point and manner of completing a game task.

(10) Quad tree: It is a tree-like data structure that can be used for placing and locating files (referred to as records or keys). The quad tree can constantly divide to-be-searched records into four parts to perform matching and searching until only one record remains.

(11) Octree: It is a tree-like data structure that is used for describing a space. Each intermediate node of the Octree represents a volume element of a cube. Each intermediate node has eight leaf nodes, and volume elements represented by the eight leaf nodes add up to a volume of the intermediate node. If the Octree is not an empty tree, a number of leaf nodes of any intermediate node in the tree is exactly 8 or 0. In other words, the number of leaf nodes is not a number other than 0 and 8.

(12) Entity object: It refers to a data set including attribute data of a plurality of types of NPCs. For example, the entity object may include the attribute data such as the appearance, the attack power, the level, and the type of the NPC.

In the related art, when a player-controlled character registers, the server creates all NPC generation rules in real time, and stores the created NPC generation rules on the player-controlled character (that is, bound to the player-controlled character). After the whole registration process and initialization of all components of the player-controlled character, an NPC data manager starts working, iteratively detects all NPC generation rules of the player-controlled character, calculates NPC basic data that needs to be generated in real time if the NPC generation rule is triggered, immediately instantiates an NPC entity object and stores the NPC entity object into the internal memory space of the server, and broadcasts and delivers the NPC entity object to a client.

In the solution provided in the related art, whether NPCs that the player-controlled character needs in a current game process, NPCs far away from the character controlled by the player (namely, the player-controlled character), or NPCs that may not interact with the player-controlled character forever is created and managed. As the player-controlled character moves in the game map, and a status of the player-controlled character changes, an AOI related component obtains all NPCs in an AOI range according to the AOI range in real time, and calculates a difference set compared with NPCs in an old AOI range. NPCs that newly appear and leave the field of view are all broadcast and delivered to the client, but the server still stores the entity objects of the NPCs. In such a solution, the NPC basic data is immediately instantiated when generated, and there is no instantiation optimization policy.

However, it is found that: The solution in the related art is very applicable, simple, and efficient in game service scenarios in which a number of player-specific NPCs is small, or in which all players share most NPCs. However, in games with a large number (for example, thousands) of player-specific NPCs (for example, open-world games), if basic data of each NPC of the player-controlled character is created and managed without any reservation, pressure on the internal memory and processing of the server and client are significantly increased, and the game experience of the player is possible to be significantly affected. In other words, the solution provided in the related art has the following disadvantages:

Disadvantage 1: A large number of NPC generation rules and basic data of NPCs are created in real time during registration, leading to a long time for the registration process, thereby reducing a number of registration concurrency; and leading to a high processing peak value of a CPU of the server, which is instable.

Disadvantage 2: Gameplay in the open-world games is rich. Therefore, the number of NPC generation rules configured by planners is very large, perhaps thousands. However, many NPC generation rules only take effect when the player creates an account, and do not change thereafter. In addition, the trigger conditions of the NPC generation rules are different. Therefore, iteratively detecting all NPC generation rules of the player in real time is very time-consuming, labor-intensive, and unnecessary.

Disadvantage 3: The NPC is immediately instantiated after the basic data of the NPC is generated. However, the player-controlled character is always limited in a small range of the open world in the game process. Therefore, most of NPCs in the open world do not interact with the player-controlled character currently. If the basic data of each NPC is instantiated to create a corresponding entity object, the internal memory space and a CPU processing capability of the server and the client are significantly wasted.

In view of this, the embodiments of this disclosure provide a data processing method and apparatus for a virtual scene, an electronic device, a computer-readable storage medium, and a computer program product, which can reduce resource overhead of a server and a terminal device. Exemplary application of an electronic device provided in the embodiments of this disclosure is described below. The electronic device provided in the embodiments of this disclosure may be implemented as a server, or the data processing method for a virtual scene may be implemented by a terminal device and a server in cooperation.

An example in which a terminal device and a server implement the data processing method for a virtual scene provided in the embodiments of this disclosure in cooperation is used for description below.

FIG. 1 is a schematic architectural diagram of a data processing system 100 for a virtual scene according to an embodiment of this disclosure. To implement application that supports effectively reducing the resource overhead of the server and the terminal device, as shown in FIG. 1, the data processing system 100 for a virtual scene includes: a server 200, a network 300, and a terminal device 400. The terminal device 400 is connected to the server 200 by the network 300. The network 300 may be a wide area network or a local area network, or may be a combination thereof.

In some embodiments, a client 410 is run on the terminal device 400. The client 410 may be a game application of various types, for example, an open-world game application, a shooting-type game application, or a strategy-type game application. A virtual scene is displayed in a man-machine interaction interface of the client 410. The client 410 can transmit a current position of a player-controlled character in the virtual scene to the server 200 through the network 300. After receiving the current position of the player-controlled character in the virtual scene transmitted by the client 410, the server 200 first determines a current query range including the current position, and queries a basic database according to the current query range, to obtain basic data respectively corresponding to a plurality of NPCs (for example, 100 NPCs) in the current query range. Then server 200 then determines weights of the plurality of NPCs, and sorts the weights of the plurality of NPCs, to obtain a descending order result. The server 200 performs instantiation processing on a first number (for example, 50) of NPCs starting from the first NPC in the descending order result, to obtain a first number of entity objects (for example, screens first 50 NPCs in the weight order from 100 NPCs for instantiation) respectively corresponding to the first number of NPCs. Eventually, the server 200 transmits the first number of entity objects to the terminal device 400, so that the client 410 renders virtual images respectively corresponding to the first number of NPCs based on the first number of entity objects transmitted by the server 200, to display the virtual images corresponding to the first number of NPCs in the current query range, for the player to interact with. In this way, by effectively controlling the number of NPCs for instantiation, resource overhead of the server and the terminal device is effectively reduced without affecting game experience of the player.

In some other embodiments, the embodiments of this disclosure may further be implemented by using a cloud technology. The cloud technology is a hosting technology that unifies a series of resources such as hardware, software, and networks in a wide area network or a local area network to implement computing, storage, processing, and sharing of data.

The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A backend service of a technical network system requires a large amount of computing and storage resources.

For example, the server 200 in FIG. 1 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal device 400 may be a smartphone, a tablet computer, a notebook computer, a desktop computer, a smart speaker, a smartwatch, an in-vehicle terminal, or the like, but is not limited thereto. The terminal device 400 and the server 200 may be directly or indirectly connected in a wired or wireless communication manner. This is not limited in the embodiments of this disclosure.

Figure 2:
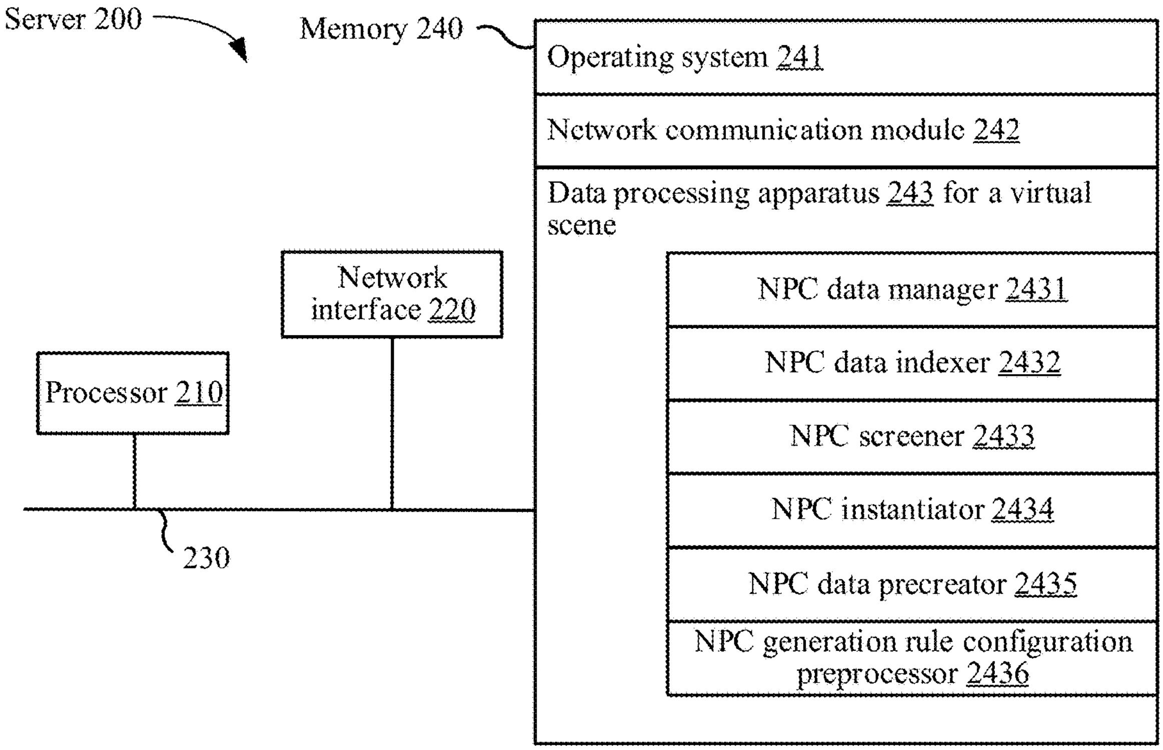
FIG. 2 is a schematic structural diagram of a server 200 according to an embodiment.

The following continues to describe a structure of the server 200 shown in FIG. 1. FIG. 2 is a schematic structural diagram of a server 200 according to an embodiment of this disclosure. The server 200 shown in FIG. 2 includes: at least one processor 210 (i.e., processing circuitry), a memory 240 (i.e., a non-transitory computer-readable storage medium), and at least one network interface 220. Components in the server 200 are coupled together by using a bus system 230. The bus system 230 is configured to implement connection and communication between the components. In addition to a data bus, the bus system 230 further includes a power bus, a control bus, and a state signal bus. However, for ease of clear description, all types of buses in FIG. 2 are marked as the bus system 230.

The processor 210 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The memory 240 may be a removable memory, a non-removable memory, or a combination thereof. Exemplary hardware devices include a solid-state memory, a hard disk drive, an optical disc driver, or the like. In some embodiments, the memory 240 includes one or more storage devices physically away from the processor 210.

The memory 240 includes a volatile memory or a non-volatile memory, or may include both a volatile memory and a non-volatile memory. The non-volatile memory may be a read-only memory (ROM). The volatile memory may be a random access memory (RAM). The memory 240 described in the embodiments of this disclosure is to include any suitable type of memories.

In some embodiments, the memory 240 can store data to support various operations. Examples of the data include a program, a module, and a data structure, or a subset or a superset thereof, which are described below by using examples.

An operating system 241 includes a system program configured to process various basic system services and perform a hardware-related task, such as a framework layer, a core library layer, and a driver layer, and is configured to implement various basic services and process a hardware-based task.

A network communication module 242 is configured to reach another computing device through one or more (wired or wireless) network interfaces 220. Exemplary network interfaces 220 include: Bluetooth, wireless compatible authentication (Wi-Fi), a universal serial bus (USB), and the like.

In some embodiments, the apparatus provided in the embodiments of this disclosure may be implemented in a form of software. FIG. 2 shows a data processing apparatus 243 for a virtual scene stored in the memory 240, which may be software in a form of a program, a plug-in, or the like, and includes the following software modules: an NPC data manager 2431, an NPC data indexer 2432, an NPC screener 2433, an NPC instantiator 2434, an NPC data precreator 2435, and an NPC generation rule configuration preprocessor 2436. These modules are logical modules, and may be combined in different manners to form other embodiments or further divided based on a function to be performed. In FIG. 2, for convenience of description, all the modules are shown at one time. However, it is not considered that an implementation in which the data processing apparatus 243 for a virtual scene may include only the NPC data manager 2431, the NPC data indexer 2432, the NPC screener 2433, and the NPC instantiator 2434 is excluded. Functions of the modules are described below.

The data processing method for a virtual scene provided in the embodiments of this disclosure is described in detail below with reference to exemplary applications and implementations of a server provided in the embodiments of this disclosure.

Figure 3:
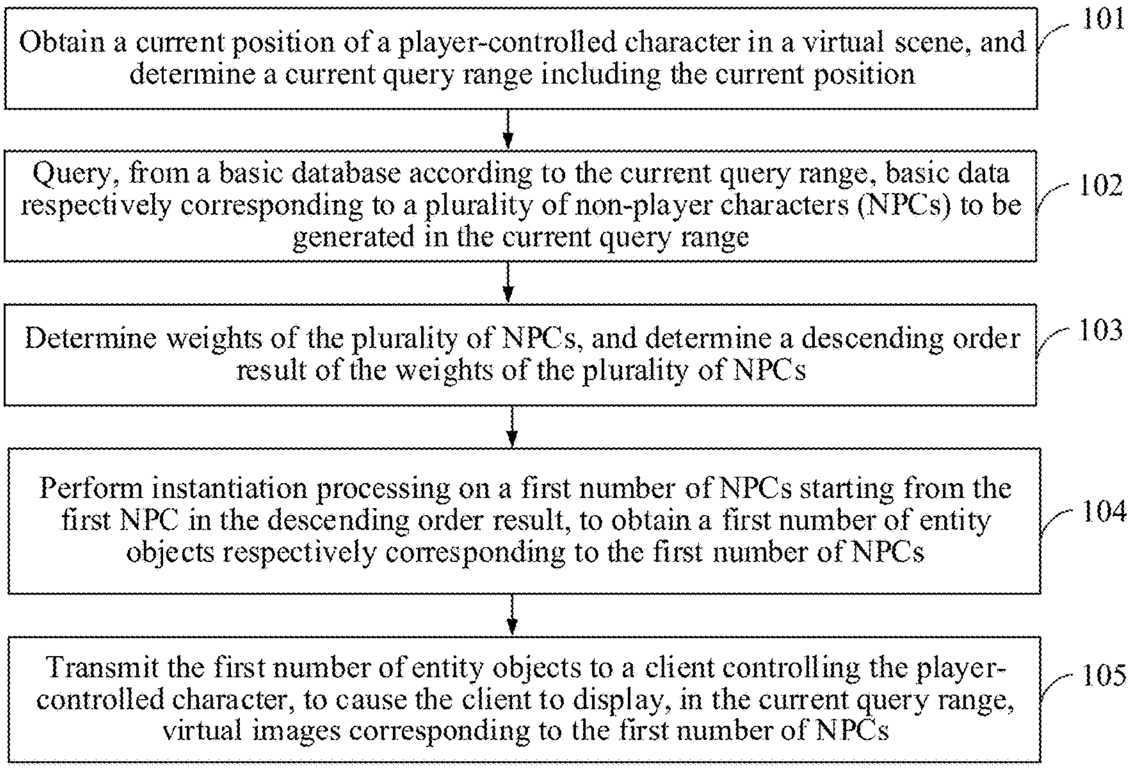
FIG. 3 is a schematic flowchart of a data processing method for a virtual scene according to an embodiment.

FIG. 3 is a schematic flowchart of a data processing method for a virtual scene according to an embodiment of this disclosure, and description is made with reference to operations shown in FIG. 3.

Operation 101. Obtain a current position of a player-controlled character in a virtual scene, and determine a current query range including the current position. For example, a query distance range is determined. Based on current position information of a character controlled by a user in a virtual scene.

In some embodiments, after receiving the current position of the player-controlled character in the virtual scene transmitted by a client, the server may determine the current query range including the current position in the following manner: determining a field of view (namely, an area of interest, whose size is equal to a size of a field of view of the player-controlled character) of a first-person perspective or a third-person perspective based on the current position as the current query range including the current position; or determining a region (for example, a circle or a rectangle) of a set size centered on the current position as the current query range including the current position.

An example in which the player-controlled character is a game character A is used. After obtaining the current position (for example, a position 1) of the game character A in the virtual scene, the client may transmit the position 1 to the server, so that the server determines the current query range including the position 1. For example, the server may determine a circle centered on the position 1 with a radius of 2 as the current query range including the position 1.

The radius may be a preset value.

A unit of the radius may be a pixel. For example, a region with a radius of 10 indicates a circle centered on the position 1 with a distance of 10 pixels from the position 1.

The unit of the radius may be a map grid. The virtual scene is presented in a form of being divided into a plurality of map grids. For example, a region with a radius of 10 indicates a region centered on the position 1 with a distance of 10 map grids from the position 1.

In some other embodiments, the server may alternatively determine a region (for example, a rectangle or a circle) larger than a field of view centered on the current position as the current query range including the current position. For example, the server may determine a rectangle larger than the field of view of the player-controlled character as the current query range including the current position. In this way, a query number of the player-controlled character moving in the virtual scene can be effectively reduced, so that communication resources and computing resources of the terminal device and the server are saved. Certainly, the current query range may alternatively be calculated based on a moving property of the player-controlled character. For example, in previous game processes, for a game character with a larger moving range, a corresponding current query range is larger. Therefore, personalization requirements of different players can be met.

Operation 102. Query, from a basic database according to the current query range, basic data respectively corresponding to a plurality of NPCs to be generated in the current query range. For example, data for a plurality of non-player characters (NPCs) is determined from a database based on NPCs to be placed in the query distance range, where the data includes a plurality of attributes respectively corresponding to each of the plurality of the NPCs.

The basic data of each NPC includes a plurality of attributes for performing instantiation processing on the NPC. Types of the attribute may include: a level, a type, a position, an attack power, appearance, and the like.

In some embodiments, the basic database may store basic data of all NPCs in the virtual scene through a multiway tree (for example, a quad tree or an octree) structure. The multiway tree structure includes: one top-level node, representing the virtual scene; a plurality of intermediate nodes, each intermediate node representing one space in the virtual scene, the space including indexes of a plurality of subordinate subspaces; and a plurality of leaf nodes, each leaf node representing one subspace in (the space represented) the intermediate node to which the leaf node belongs, the subspace including basic data of a NPC in the subspace. Therefore, the server may implement operation 102 in the following manner: querying the multiway tree structure according to the current query range, to obtain at least one intermediate node covered by the current query range in the multiway tree structure; and querying each leaf node included in each covered intermediate node, and using queried basic data respectively corresponding to a plurality of NPCs as the basic data respectively corresponding to the plurality of NPCs to be generated in the current query range.

For example, the octree structure is used as an example. After determining the current query range including the current position, the server may query the octree structure according to the current query range, to obtain at least one intermediate node covered by the current query range in the octree structure. It is assumed that an intermediate node 1 and an intermediate node 2 in the octree structure are covered by the current query range. The server may then respectively query each leaf node included in the intermediate node 1 and the intermediate node 2. For example, it is assumed that the intermediate node 1 includes a leaf node 1 (it is assumed that basic data of a NPC 1 is stored) and a leaf node 2 (it is assumed that basic data of a NPC 2 is stored), the intermediate node 2 includes a leaf node 3 (it is assumed that basic data of a NPC 3 is stored) and a leaf node 4 (it is assumed that basic data of a NPC 4 is stored), and the queried basic data respectively corresponding to the plurality of NPCs (namely, the NPC 1, the NPC 2, the NPC 3, and the NPC 4) is determined as the basic data respectively corresponding to the plurality of NPCs to be generated in the current query range.

In some embodiments, continuing the foregoing example, the basic data of the NPC may be extracted from a generation rule of the NPC (for example, the basic data of the NPC 1 is extracted from a dynamic generation rule 1). Types of the generation rule include a static generation rule (namely, a generation rule of a NPC with a fixed attribute, for example, a generation rule of a guide NPC in a game, where the attribute of the guide NPC does not change in a game process) and a dynamic generation rule (namely, a generation rule of a NPC with a dynamically changing attribute, for example, a generation rule of a combat NPC, where an attack power of the combat NPC continuously increases as the game progresses), and the dynamic generation rule is stored in a rule database. Therefore, when the player-controlled character is in the virtual scene, the server may further perform the following processing: deleting, from the basic database in response to expiration of any dynamic generation rule (for example, the dynamic generation rule 1) in the rule database, basic data extracted from the any dynamic generation rule (for example, when detecting that the dynamic generation rule 1 in the rule database expires, the server may delete, from the basic database, the basic data of the NPC 1 extracted from the dynamic generation rule 1); and merging a plurality of subspaces into one leaf node, in response to at least a part of basic data in a plurality of (namely, at least two) subspaces represented by any intermediate node of the multiway tree being deleted, and a data volume of remaining basic data in the plurality of subspaces is less than a data volume threshold (for example, ten bits).

In some other embodiments, the basic data of the NPC may be extracted from a generation rule of the NPC (the guide NPC is used as an example, basic data of the guide NPC may be extracted from a static generation rule 1). The types of the generation rule may include the static generation rule and the dynamic generation rule, and the dynamic generation rule is stored in the rule database. Therefore, when the player-controlled character is in the virtual scene, the server may further perform the following processing: extracting, in response to any rule execution condition included in any dynamic generation rule in the rule database being met, the basic data corresponding to the NPC from the any dynamic generation rule; storing the extracted basic data of the NPC into a target leaf node (for example, the leaf node 4 in the multiway trec structure) in the multiway tree structure, the extracted basic data of the NPC including a position of the NPC in the virtual scene, and the position of the NPC belonging to a subspace of the target leaf node; and converting the target leaf node into a new intermediate node in response to a data volume of the target leaf node reaching (being greater than or equal to) a data volume threshold, and transferring the basic data stored in the target leaf node to two new subordinate leaf nodes of the new intermediate node.

The data volume threshold may be a preset value.

For example, the dynamic generation rule 1 is used as an example. It is assumed that the dynamic generation rule 1 is "when the level of the player-controlled character reaches level 10, and the player-controlled character reaches the grassland in the virtual scene, an NPC 1 with an attack power of 100, a level of 10, and a type of grass type at a position A in the virtual scene". Therefore, when detecting that any rule execution condition included in the dynamic generation rule 1 in the rule database is met (for example, detecting that the player-controlled character with level 10 reaches the grassland in the virtual scene), the server may extract the basic data (for example, a position, an attack power, a level, and a type of the NPC 1) corresponding to the NPC 1 from the dynamic generation rule 1, and stores the extracted basic data of the NPC 1 into the target leaf node (for example, the leaf node 4 in the octree structure) in the multiway tree (for example, the octree) structure. The position of the NPC 1 belongs to a subspace of the leaf node 4. When detecting that the data volume of the leaf node 4 is greater than the data volume threshold (for example, 10 bits), the server may convert the target leaf node 4 into a new intermediate node, and transfers the basic data stored in the target leaf node 4 to two new subordinate leaf nodes of the new intermediate node.

Operation 103. Determine weights of the plurality of NPCs, and determine a descending order result of the weights of the plurality of NPCs. For example, weights for each of the plurality of NPCs are determined.

In some embodiments, the server may determine the weights of the plurality of NPCs in the following manner: performing the following processing for each NPC located in the plurality of NPCs: performing quantification processing on a status of at least one dimension of the NPC, to obtain at least one quantized value; determining, when the at least one quantized value includes one quantized value, the quantized value as a weight of the NPC; and performing, when the at least one quantized value includes a plurality of quantized values, weighted summation on the plurality of quantized values, and determining an obtained weighted summation result as the weight of the NPC. Types of the status may include at least one of the following: a geographical positional relationship between the NPC and the player-controlled character, where the geographical positional relationship may include a distance (a two-dimensional or three-dimensional straight line length spanned in a map of the virtual scene), a location (for example, when the NPC is located directly in front of the player-controlled character, the corresponding quantized value may be 1; and when the NPC is located behind the player-controlled character, the corresponding quantized value may be 0), an orientation (for example, when the NPC faces the player-controlled character, the corresponding quantized value may be 1; and when the NPC faces away from the player-controlled character, the corresponding quantized value may be 0), and the like between the NPC and the player-controlled character, whether the NPC and the player-controlled character are in the same team, a social relationship between the NPC and the player-controlled character, whether the NPC and the player-controlled character are in an antagonistic relationship, or whether the NPC appears in a historical field of view of the player-controlled character.

In some embodiments, for each NPC, the server may determine weights of statuses of different dimensions of the NPCs in the following manner.

In an example of determining the quantized value of the distance, a result of dividing the distance between the NPC and the player-controlled character by a preset distance may be determined as the corresponding quantized value. For example, if the distance between the NPC and the player-controlled character is 7, and the preset distance is 10, the quantized value corresponding to the distance is 0.7.

In an example of determining the quantized value of whether the NPC and the player-controlled character are in the same team, for example, when the NPC and the player-controlled character are in the same team, the corresponding quantized value may be 1; and when the NPC and the player-controlled character are not in the same team, the corresponding quantized value may be 0.

In an example of determining the quantized value of the social relationship between NPC and the player-controlled character, for example, when the NPC and the player-controlled character are in the social relationship, the corresponding quantized value may be 1; and when the NPC and the player-controlled character are not in the social relationship, the corresponding quantized value may be 0.

In an example of determining the quantized value of whether the NPC and the player-controlled character are in the antagonistic relationship, for example, when the NPC and the player-controlled character are in the antagonistic state, the corresponding quantized value may be 1; and when the NPC and the player-controlled character are not in the antagonistic relationship, the corresponding quantized value may be 0.

In an example of determining whether the quantized value appears in the historical field of view of the player-controlled character, for example, when the NPC has appeared in the historical field of view, the corresponding quantized value may be 1; when the NPC does not appear in the historical field of view of the player-controlled character, the corresponding quantized value may be 0;

Weighted summation is performed on a plurality of quantized values, and a result of the weighted summation is determined as the weight of the NPC.

For example, the NPC 1 is used as an example. It is assumed that the distance between the NPC 1 and the player-controlled character is 8, the NPC 1 and the player-controlled character are in the same team, the NPC 1 and the player-controlled character are not in a friend relationship, the NPC 1 and the player-controlled character are in the antagonist relationship (for example, the player-controlled character has attacked the NPC 1, causing the antagonist relationship between the NPC 1), and the NPC 1 has appeared in the historical field of view of the player-controlled character. In this case, after performing quantification processing on the statuses of the plurality of dimensions of the NPC 1, the server may obtain a plurality of quantized values correspondingly, which are 0.8, 1, 0, 1, and 1, respectively. The server may then perform weighted summation on the plurality of quantized values, and determine the obtained result (for example, it is assumed that a weight corresponding to each quantized value is 0.5, the result of weighted summation is: $0.5\times0.8+0.5\times1+0.5\times0+0.5\times1+0.5\times1=1.9$) of weighted summation as the weight of the NPC 1 (that is, the weight of the NPC 1 is 1.9). Certainly, the weights corresponding to different quantized values may alternatively be different. For example, for each quantized value, a corresponding weight may be separately configured by planners. This is not specifically limited in the embodiments of this disclosure.

Operation 104. Perform instantiation process on a first number of NPCs starting from the first NPC in the descending order result, to obtain a first number of entity objects respectively corresponding to the first number of NPCs. For example, a first number of NPCs is generated based on a descending order of the weights for each of the plurality of NPCs, where the first number of NPCs is a subset of the plurality of NPCs.

The first number is less than a total number of the plurality of NPCs. For example, when the total number of the plurality of NPCs is 100, and the first number may be 80.

The first number may be a fixed number (for example, 80), or may change dynamically according to a type of a region to which the current query range of the player-controlled character belongs. In other words, when the player-controlled character is in regions of different types, values of the first number are different. The following describes in detail for a case that the first number is a dynamic value.

In some embodiments, before performing instantiation processing on the first number of NPCs starting from the first NPC in the descending order result, the server may further perform the following processing: adjusting, according to a type of a region to which the current query range belongs, the weights of the plurality of NPCs in an adjustment mode corresponding to the type; and determining at least one NPC with a weight exceeding a weight threshold in the plurality of adjusted NPCs as the first number of NPCs.

For example, when the region to which the current query range belongs is a publish region such as an amphitheater or a town in the virtual scene, because the player has strong interaction requirement in the publish region such as the amphitheater or the town, the weights of the plurality of NPCs in the current query range may be increased. For example, the weights of the plurality of NPCs may be multiplied by a preset coefficient (for example, 1.5) greater than 1, so that a number of the NPCs (namely, the NPC on which instantiation processing needs to be performed) exceeding the weight threshold increases (for example, it is assumed that the weight threshold is 1, and the weight of the NPC 1 is 0.8, that is, the weight of the NPC 1 before adjustment is less than the weight threshold, and after adjusting the weight of the NPC 1, the weight of the NPC 1 is changed into 1.2, which is greater than the weight threshold, so that instantiation processing can be performed on the NPC 1), to display more NPCs in the client for the player to interact with.

For example, when the region to which the current query range belongs is a private region such as a residence of the player-controlled character or a training ground in the virtual scene, because the player has weak interaction requirement in the private region such as the residence or the training ground, the weights of the plurality of NPCs in the current query range may be reduced. For example, the weights of the plurality of NPCs may be multiplied by a coefficient (for example, 0.7) less than 1, so that a number of the NPCs (namely, the NPC on which instantiation processing needs to be performed) exceeding the weight threshold reduces, so that fewer NPCs are displayed in the client. Therefore, while meeting requirements of the player, resource overhead of the server and the terminal device is further reduced.

In some embodiments, the first number may alternative be dynamically determined according to a load of the server, and before performing instantiation processing on the first number of NPCs starting from the first NPC in the descending order result, the server may further perform the following processing: determining the first number by performing one of the following processing: comparing a current load of the server with a set reference load, the reference load being calibrated through a preset value; and increasing the preset value by a preset amplitude or ratio when the current load of the server is lower than the reference load, and determining the increased preset value as the first number; and reducing the preset value by a preset amplitude or ratio when the current load of the server is higher than the reference load, and determining the reduced preset value as the first number; or determining a range in which the current load of the server is located in a plurality of preset reference load ranges, and determining an instantiation number corresponding to the range as the first number, different reference load ranges corresponding to different instantiation numbers.

For example, a preset value may be first determined according to previous instantiation numbers (for example, an average value of a plurality of previous instantiation numbers may be used as the preset value), a reference load is calibrated according to the preset value (for example, 50), and then a load situation of the server may be obtained through an interface provided by a server load detector. When the current load of the server is less than the reference load, current pressure of the server is relatively small, and the preset value may be increased by the preset amplitude (for example, 5) or ratio (for example, 10%), and the increased preset value (namely, 55) is determined as the first number. When the current load of the server is greater than the reference load, the current pressure of the server is relatively large, and the preset value may be reduced by the preset amplitude (for example, 5) or ratio (for example, 10%), and the reduced preset value (namely, 45) is determined as the first number. In this way, the load of the server is fully balanced, the capability of the server is utilized, and game experience of the player is not affected.

For example, a plurality of reference load ranges may be pre-set. Each reference load range corresponds to an instantiation number. For example, five reference load ranges may be pre-set, including a reference load range 1 (0% to 20%), a reference load range 2 (20% to 40%), a reference load range 3 (40% to 60%), a reference load range 4 (60% to 80%), and a reference load range 5 (80% to 100%). The instantiation number corresponding to the reference load range 1 is 100, the instantiation number corresponding to the reference load range 2 is 80, the instantiation number corresponding to the reference load range 3 is 60, the instantiation number corresponding to the reference load range 4 is 40, and the instantiation number corresponding to the reference load range 5 is 20. The load situation of the server can then be obtained through the interface provided by the server load detector. It is assumed that the current load of the server is 50%, that is, the current load of the server is in the reference load range 3, and the instantiation number (namely, 60) corresponding to the reference load range 3 can be determined as the first number.

In some other embodiments, the first number may alternatively be a fixed number (for example, 50), or a fixed ratio (for example, 60%) of the total number of the NPCs. This is not specifically limited in the embodiments of this disclosure.

In some embodiments, the server may implement operation 104 in the following manner: allocating a storage area in an internal memory space; and generating the entity objects respectively corresponding to the first number of NPCs in the storage area, the entity object including a variable representing an attribute of the NPC.

For example, after filtering the plurality of NPCs to be generated (for example, 20 NPCs) in the current query range, to obtain the first number of NPCs (for example, 10 NPCs), the server may allocate a storage area (a size of the storage area is positively correlated to the first number) in the internal memory space. The server may then generate entity objects respectively corresponding to 10 NPCs in the allocated storage area, and records the attributes (for example, the attack power, the appearance, the position, and the level) of the 10 NPCs in the internal memory space. In this way, for the plurality of NPCs to be generated in the current query range, a part of NPCs with weights ranked in a header range is obtained by screening, and instantiation processing is performed on the part of NPCs obtained by screening. This effectively controls a number of NPC entity objects, and significantly reduces the resource overhead of the client and the server without affecting the game experience of the player.

Operation 105. Transmit the first number of entity objects to the client controlling the player-controlled character, to cause the client to display, in the current query range, virtual images corresponding to the first number of NPCs. For example, the generated first number of NPCs is transmitted to the client controlling the player-controlled character, to cause the client to display, in the query distance range, virtual images corresponding to the first number of NPCs.

After receiving the first number of entity objects transmitted by the server, the client may render virtual images respectively corresponding to the first number of NPCs based on the first number of entity objects. For example, the client may render a virtual image of the NPC 1 based on appearance data included in the entity object of the NPC 1, for display in the current query range.

For convenience of description, this is referred to as displaying the entity object corresponding to the NPC below. The "displaying the entity object corresponding to the NPC" described below refers to "displaying the rendered virtual image corresponding to the NPC based on the entity object".

In some embodiments, before transmitting the first number of entity objects to the client controlling the player-controlled character, the server may further perform the following processing: comparing the current query range with a historical query range, the historical query range being a query range including a historical position, the historical position being a position at which the player-controlled character is located before the current position in the virtual scene (for example, if the player-controlled character moves from the position 1 to a position 2 in the virtual scene, the position 1 is the historical position, and the position 2 is the current position); performing, in response to the current query range being completely different from the historical query range, the process of transmitting the first number of entity objects to the client controlling the player-controlled character; transmitting, in response to existence of an intersection region between the current query range and the historical query range, an entity object corresponding to another NPC (namely, a NPC located outside the intersection region in the first number of NPCs) to the client controlling the player-controlled character, to cause the client to continue to display an entity object corresponding to a NPC in the intersection region and an entity object corresponding to a NPC in another region (namely, a region other than the intersection region in the current query range); and transmitting, in response to existence of a difference region in the historical query range compared with the current query range, a notification message to the client controlling the player-controlled character, the notification message being configured for notifying the client to delete an entity object corresponding to a NPC in the difference region.

Figure 4A:
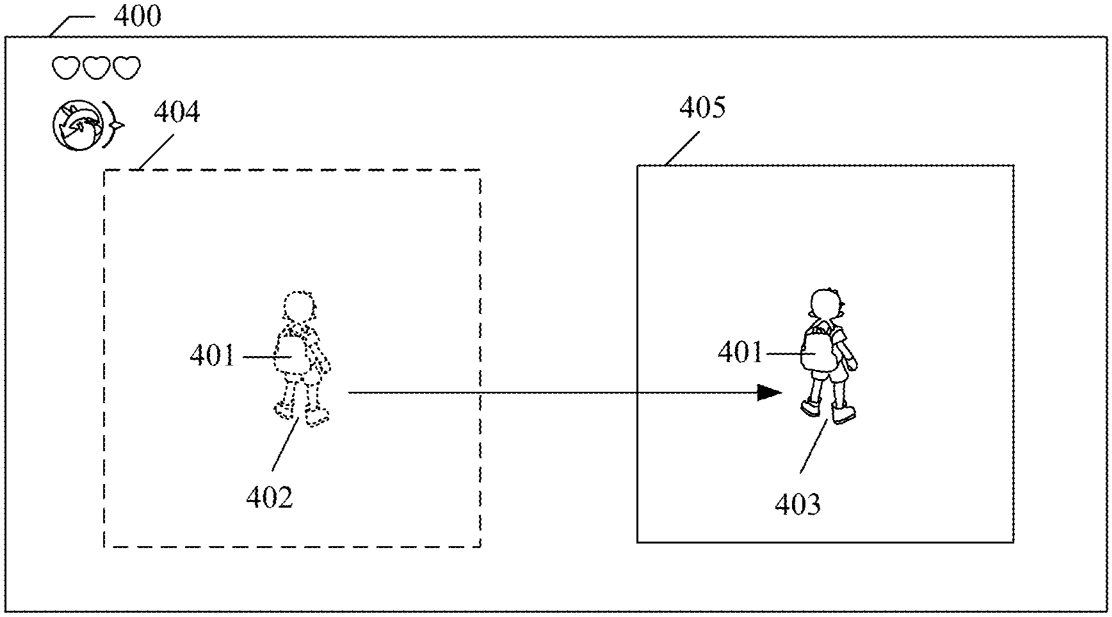
FIG. 4A is a schematic diagram of a principle of a data processing method for a virtual scene according to an embodiment.

For example, FIG. 4A is a schematic diagram of a principle of a data processing method for a virtual scene according to an embodiment of this disclosure. As shown in FIG. 4A, a player-controlled character 401 is displayed in a virtual scene 400. It is assumed that the player-controlled character 401 moves from a historical position 402 (for example, a position 1 in the virtual scenc) to a current position 403 (for example, a position 2 in the virtual scene) in the virtual scene 400, and a historical query range 404 including the historical position 402 is completely different from a current query range 405 including a current position 403 (that is, the historical query range 404 does not overlap the current query range 405). Therefore, the server can transmit a first number of entity objects to the client controlling the player-controlled character 401, so that the client displays the entity objects corresponding to the first number of NPCs in the current query range 405. In addition, the server may further transmit a notification message to the client controlling the player-controlled character 401, to cause the client to delete the entity object corresponding to the NPC in the historical query range 404. In this way, internal memory resources of the terminal device can be effectively saved.

Figure 4B:
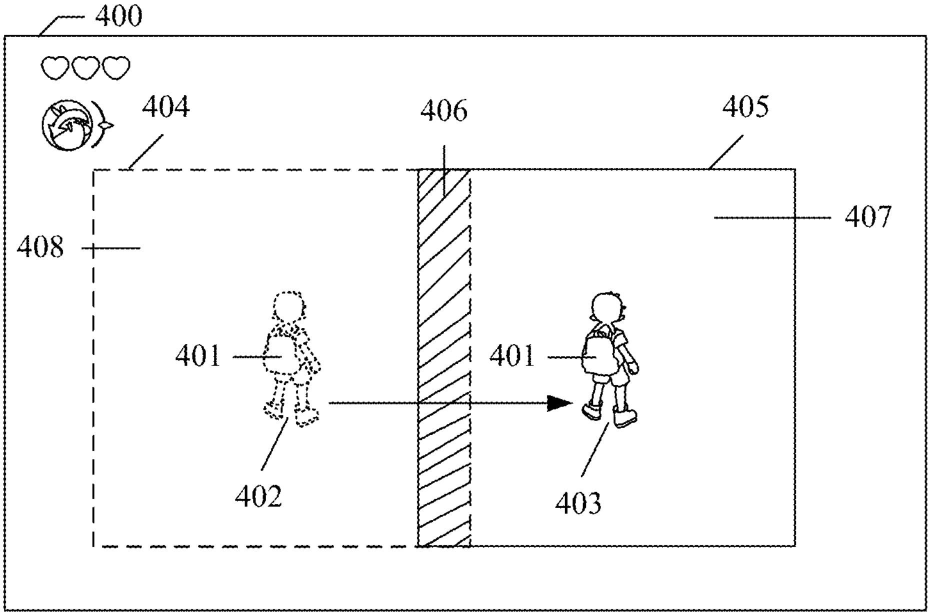
FIG. 4B is a schematic diagram of a principle of a data processing method for a virtual scene according to an embodiment.

For example, FIG. 4B is a schematic diagram of a principle of a data processing method for a virtual scene according to an embodiment of this disclosure. As shown in FIG. 4B, the player-controlled character 401 is displayed in the virtual scene 400. It is assumed that the player-controlled character 401 moves from the historical position 402 to the current position 403 in the virtual scene 400, and there is an intersection region 406 (that is, a shadow region shown in FIG. 4B) between the historical query range 404 including the historical position 402 and the current query range 405 including the current position 403. Therefore, the server can only transmit, to the client controlling the player-controlled character 401, an entity object corresponding to a part of the NPCs located outside the intersection region 406 in the first number of NPCs, so that the client continues to display an entity object corresponding to the NPC (namely, an old NPC) in the intersection region 406, and an entity object corresponding to a NPC (namely, a newly appeared NPC after the player-controlled character 401 moves to the current position 403) in another region 407 (namely, a region obtained by subtracting the intersection region 406 from the current query range 405). In addition, the server may further transmit a notification message to the client, to cause the client to delete the entity object corresponding to the NPC in a difference region 408 (namely, a region obtained by subtracting the intersection region 406 from the historical query range 404). In this way, display efficiency of the entity object corresponding to the NPC is improved, and communication resources and computing resources of the server and the terminal device are saved.

In some other embodiments, continuing the foregoing example, before transmitting the notification message to the client controlling the player-controlled character, the server may further perform the following processing: performing the following processing for each NPC located in the difference region: adding a new field in the basic database, and storing status data (for example, a current life value, a current magic value, and skills possessed by the NPC) of the entity object corresponding to the NPC into the new field.

For example, an example in which the basic database stores the basic data of all the NPCs in the virtual scene through the multiway tree structure is used. The leaf node 1 of the multiway tree stores the basic data of the NPC 1, the leaf node 2 stores the basic data of the NPC 2, and the leaf node 3 stores the basic data of the NPC 3. In addition, it is assumed that there are three NPCs in the difference region, which are respectively the NPC 1, the NPC 2, and the NPC 3. In this case, the server can store the status data of the entity object corresponding to the NPC 1 into the leaf node 1, store the status data of the entity object corresponding to the NPC 2 into the leaf node 2, and stores the status data of the entity object corresponding to the NPC 3 into the leaf node 3. In this way, when required to be displayed again, the entity object corresponding to the NPC in the difference region can be accurately created according to the stored status data.

Figure 5:
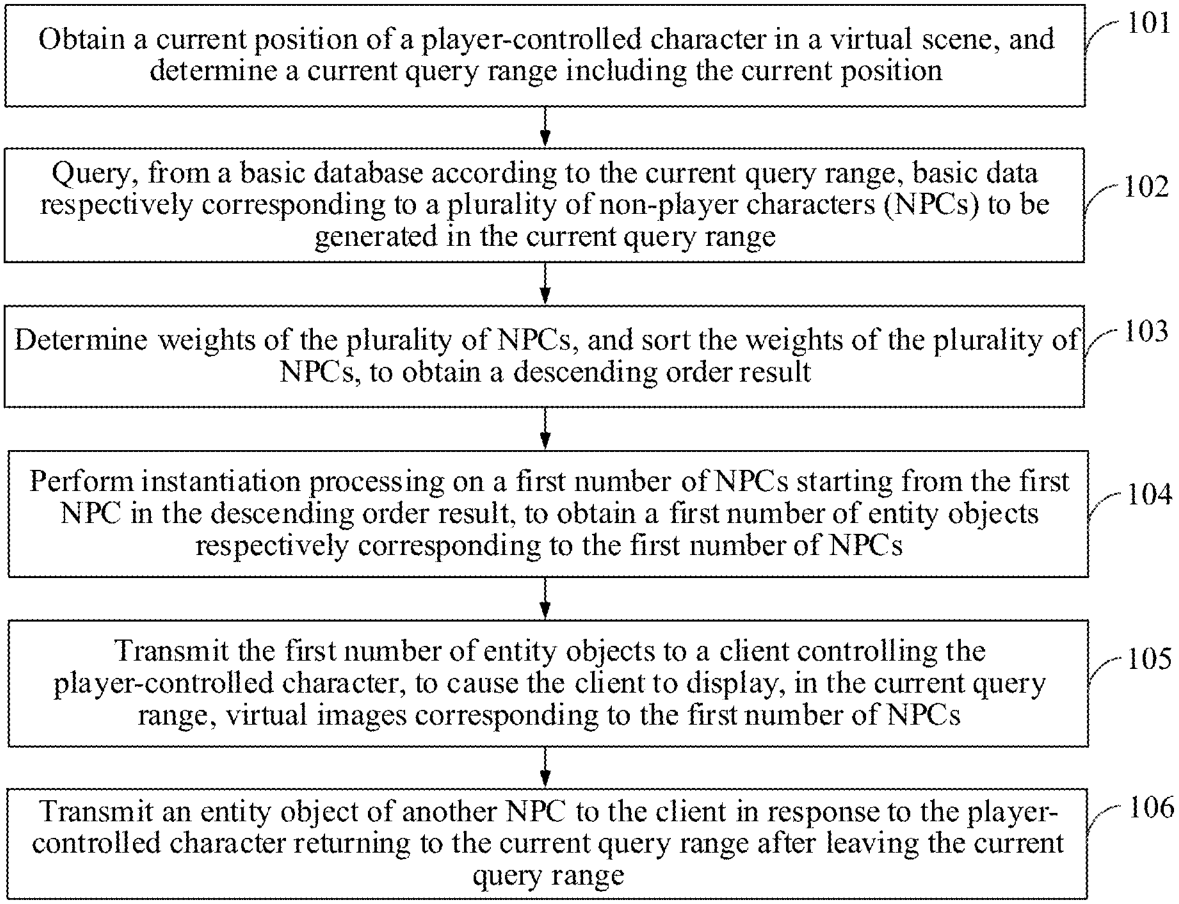
FIG. 5 is a schematic flowchart of a data processing method for a virtual scene according to an embodiment.

In some embodiments, FIG. 5 is a schematic flowchart of a data processing method for a virtual scene according to an embodiment of this disclosure. As shown in FIG. 5, after performing operation 105 shown in FIG. 3, operation 106 shown in FIG. 5 may further be performed, and description is made with reference to operations shown in FIG. 5.

Operation 106. Transmit an entity object of another NPC to the client in response to the player-controlled character returning to the current query range after leaving the current query range.

The another NPC is a NPC other than the first number of NPCs in the current query range.

In some embodiments, an example in which the current query range is an area of interest 1 in the virtual scene is used. It is assumed that there always be 20 NPCs in the area of interest 1. When the player-controlled character enters the area of interest 1 for the first time, the server may transmit the entity objects respectively corresponding to the first number (for example, ten) of NPCs (for example, ten NPCs in the descending order result starting from the first NPC) to the client controlling the player-controlled character, to cause the client to display the entity objects of the ten NPCs in the area of interest 1. Subsequently, when the player-controlled character returns to the area of interest 1 after leaving the area of interest 1, the server may perform instantiation processing on the ten remaining NPCs (for example, the NPCs ranked in the bottom ten positions in the descending order result), and transmit the entity objects of the ten remaining NPCs to the client (that is, when the player-controlled character enters the same AOI again, the server can deliver previously missing entity objects of the NPCs to the client, to cause the client to display the entity objects of the ten remaining NPCs in the area of interest 1), thereby ensuring completeness of the game experience of the player.

In some embodiments, the basic database stores the basic data of each NPC, the rule database stores generation rules corresponding to all the NPCs, and types of the generation rules are all dynamic generation rules. The dynamic generation rule is a generation rule of a NPC with a dynamically changing attribute, and each dynamic generation rule includes a plurality of rule execution conditions, such as a position condition and a weather condition. When different rule execution conditions are met, basic data extracted from the dynamic generation rule is different. When the player-controlled character is in the virtual scene, the server may further perform the following processing: updating the basic database in the following manner: performing an expiration check on each dynamic generation rule stored in the rule database; deleting, from the basic database in response to an expired dynamic generation rule (for example, the dynamic generation rule 1) appearing in the rule database, basic data extracted from the expired dynamic generation rule, and deleting the expired dynamic generation rule from the rule database, for example, when it is assumed that the server detects that the dynamic generation rule 1 in the rule database expires, the server may delete, from the basic database, the basic data extracted from the dynamic generation rule 1, for example, the basic data of the NPC 1, and the server may further delete the dynamic generation rule 1 from the rule database; extracting, in response to a rule execution condition (for example, the dynamic generation rule 2) included in any dynamic generation rule in the rule database being met, new basic data from the any dynamic generation rule, and replacing original basic data corresponding to the any dynamic generation rule in the basic database with the new basic data. Using the dynamic generation rule 2 as an example, it is assumed that the dynamic generation rule 2 is: "when the weather in the virtual scene is sunny, an NPC 1 with the attack power of 20 and the level of 3 is generated at the position A of the virtual scene; and when the weather changes from sunny to rainy, the attack power of the NPC 1 increases from 20 to 40". When detecting that the rule execution condition included in the dynamic generation rule 2 is met, for example, detecting that the weather in the virtual scene changes from sunny to rainy, the server can extract new basic data of the NPC 1 from the dynamic generation rule 2, for example, the attack power is 40, and replace original basic data (for example, the attack power is 20) corresponding to the dynamic generation rule 2 in the basic database with the new basic data.

In some other embodiments, continuing the foregoing example, each dynamic generation rule further includes an unlocking condition (for example, including a level condition and a time condition). When the player-controlled character is in the virtual scene, the server may further perform the following processing: updating the rule database in the following manner: using, in response to any dynamic generation rule in the rule database meeting a rule delction condition (for example, the NPC corresponding to the dynamic generation rule is deleted), the any dynamic generation rule as an expired dynamic generation rule, and deleting the expired dynamic generation rule from the rule database, for example, when the server detects that a type of NPC in the virtual scene is deleted (for example, as a game version is updated, a type of NPC is removed from the game by a game developer), the server can use a dynamic generation rule corresponding to the type of NPC as the expired dynamic generation rule, and delete the expired dynamic generation rule from the rule database; and using, in response to an unlocking condition included in any dynamic generation rule in a full database being met, for example, the level of the player-controlled character reaches a player threshold, which is level 10, the any dynamic generation rule as a newly unlocked dynamic generation rule to be stored into the rule database. In this case, for the generation rule corresponding to the NPC (for example, the guide NPC) whose attribute does not change any more after registration, namely, the static generation rule, only the NPC basic data extracted from the static generation rule is stored, and the generation rule itself is not stored, and therefore, is not detected any more. The generation rule (namely, the dynamic generation rule) corresponding to the NPC (for example, the combat NPC) whose attributes, such as the attack power and the level, may change, may be classified according to a type (for example, the level and the time) of the unlocking condition. In this way, when a condition changes, only the generation rule including the type of conditions needs to be checked, implementing accurate detection.

For example, an example in which the unlocking condition is the level condition, the dynamic generation rule stored in the full database may include the level condition. Using the dynamic generation rule 1 as an example, the dynamic generation rule 1 may be "when the level of the player-controlled character reaches level 5, an NPC 1 with the attack power of 30 and the level of 5 is generated at the position A in the virtual scene". Therefore, when detecting that the level of the player-controlled character reaches level 5, the server may use the dynamic generation rule 1 as the newly unlocked dynamic generation rule into the rule database.

For example, an example in which the unlocking condition is the time condition, the dynamic generation rule stored in the full database may include the time condition. Using the dynamic generation rule 2 as an example, the dynamic generation rule 2 may be "when the game duration reaches 30 minutes, an NPC 2 with the attack power of 50 and the level of 6 is generated at the position B in the virtual scene". Therefore, when detecting that game duration of the player reaches 30 minutes, the server may use the dynamic generation rule 2 as the newly unlocked dynamic generation rule into the rule database.

In some other embodiments, before obtaining the current position of the player-controlled character in the virtual scene, the server may further perform the following processing: initializing the rule database and the basic database in the following manner in a registration stage of the player-controlled character: obtaining all generation rules from the full database; classifying all the generation rules into the static generation rules and the dynamic generation rules; extracting basic data corresponding to the NPC (for example, the guide NPC) with a fixed attribute from the static generation rules, extracting basic data corresponding to the NPC (for example, the combat NPC) with a dynamically changing attribute from the dynamic generation rules, and storing the extracted basic data into the basic database, for example, the basic data may be the basic data of the NPC with the fixed attribute and the basic data of the NPC with the dynamically changing attribute; and storing the dynamic generation rules obtained by classifying all the generation rules into the rule database.

In some embodiments, some attributes (for example, the attack power and the level) included in the basic data of the NPC stored in the basic database may further be modified according to the level of the player-controlled character in a registration stage. Using the level as an example, it is assumed that the level of the player-controlled character in the registration stage is level 1, the level of the NPC included in the basic data stored in the basic database may be modified as level 1. Using the NPC 1 as an example, it is assumed that the level of the NPC 1 is level 3 in the basic data of the NPC 1 stored in the basic database, the level of the NPC 1 may also be modified as level 1 according to the level of the player-controlled character, so that the level of the NPC adapts to the level of the player-controlled character.

In some other embodiments, continuing the foregoing example, before obtaining all the generation rules from the full database, the server may further perform the following processing: obtaining, in an initialization stage, all generation rules that the planners configured for the virtual scene, the initialization stage including at least one of the following: a startup stage of the server and a stage in which the load of the server is lower than a load threshold; determining, based on all the generation rules, a type of a NPC that needs to be generated in the virtual scene; and extracting the basic data of the NPC of each type from all the generation rules, and storing the extracted basic data of the NPC of each type, and all the generation rules into the full database. In this way, when the server starts up or is idle, the server precreates all the NPC generation rules and the NPC basic data, for direct use of players during registration, and does not need to create the NPC generation rules and the NPC basic data in real time during registration, which effectively reducing registration duration and a CPU peak value of the server.

In the data processing method for a virtual scene provided in the embodiments of this disclosure, after the basic data of the plurality of NPCs to be generated in the current query range is obtained, a part of NPCs (for example, the first number of NPCs) are screened, according to the weights of the plurality of NPCs, from the plurality of NPCs to be generated in the current query range, then instantiation processing is performed on the first number of NPCs that are screened, and the first number of entity objects are transmitted to the client. In this way, the number of the entity objects corresponding to the NPCs displayed in the client are effectively controlled, so that the resource overhead of the server and the terminal device is effectively reduced without affecting the game experience of the player.

The following describes an exemplary application of the embodiments of this disclosure in an actual application scenario by using an open-world game as an example.

This embodiment of this disclosure provides a data processing method for a virtual scene that may be applied to a single-player open-world game, implementing generation and management of a large amount of NPC basic data, creation and maintenance of NPC entity objects, and visibility management of the player-controlled character in the game. The solution provided in this embodiment of this disclosure divides a creation process of the NPC entity objects into two stages: basic data generation (namely, a refresh generation process) and entity object creation (namely, an instantiation process). In the refresh generation process, an NPC data manager generates and manages the NPC basic data in a game process according to the NPC generation rules. In the instantiation process, an NPC instantiator obtains all the NPC basic data in a specified range (corresponding to the foregoing current query range) from the NPC data manager, then an NPC screener screens a piece of NPC basic data with the highest priority based on weights for creating corresponding NPC entity objects, and delivers the NPC entity objects to the client for display. The solution provided in this embodiment of this disclosure has a high degree of modularity and good abstraction, and can well control use of internal memory, which improves processing efficiency of the whole process, avoids other modules wasting time on unnecessary NPC entity objects, and does not affect the game experience of the player.

Figure 6:
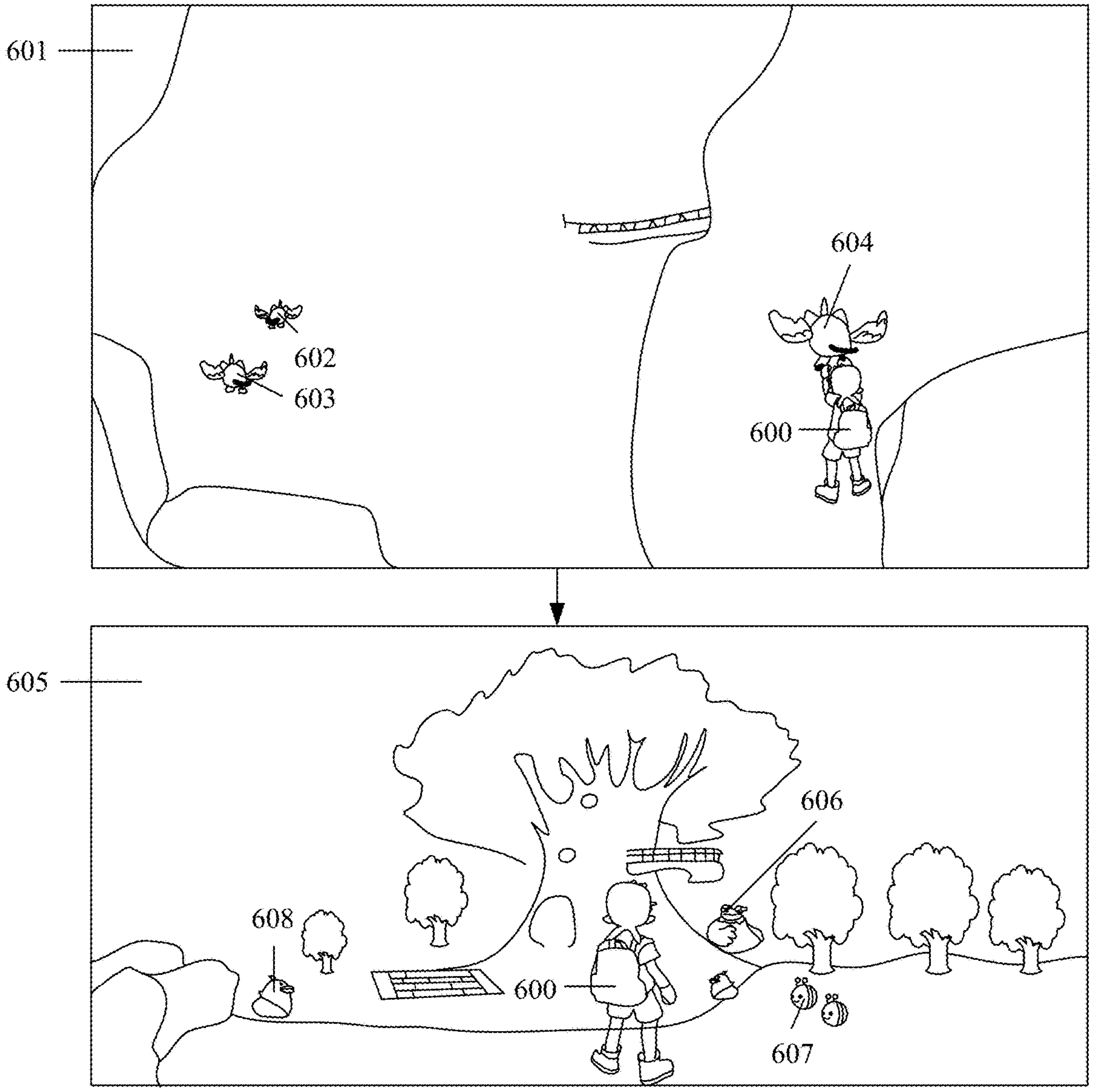
FIG. 6 is a schematic diagram of an application scenario of a data processing method for a virtual scene according to an embodiment.

For example, FIG. 6 is a schematic diagram of an application scenario of a data processing method for a virtual scene according to an embodiment of this disclosure. As shown in FIG. 6, the character (namely, a player-controlled character 600) controlled by the player in the game flies in the sky, and there are three NPCs in a field of view range 601 of the player-controlled character 600, which are an NPC 602, an NPC 603, and an NPC 604, respectively. As the player-controlled character 600 continues to fly and land, NPCs in the field of view range of the player-controlled character 600 continuously change. For example, some old NPCs may disappear from a current field of view range (for example, a field of view range 605) of the player-controlled character 600 along with moving of the player-controlled character. For example, the NPC 602 and the NPC 603 shown in FIG. 6 are NPCs only existing in a specific region in the virtual scene, when the player-controlled character 600 leaves the region, the NPC 602 and the NPC 603 disappear from the current field of view range of the player-controlled character 600.

Some old NPCs may be always located in the field of view range of the player-controlled character 600, for example, the NPC 604 in the field of view range 601 is a virtual flying vehicle for carrying the player-controlled character 600, and moves along with the player-controlled character 600. Therefore, the NPC 604 does not disappear from the field of view range along with the moving of the player-controlled character 600. Certainly, after sending the player-controlled character 600 to a destination, the NPC 604 may be packed in a virtual pack of the player-controlled character, to disappear from the field of view range of the player-controlled character.

Certainly, new NPCs may appear in the field of view range of the player-controlled character 600 at the same time. For example, after the player-controlled character 600 lands, NPCs appeared in the field of view range 605 significantly change, and types of the NPCs also change. For example, new NPC 606, NPC 607, and NPC 608 appear in the field of view range 605, and at least a part of NPCs (for example, the NPC 602 and the NPC 603) in the field of view range 601 does not only disappear in the field of view range 605, and are optimized and deleted in the client and the server. In this case, the server notifies the client that which old NPCs leave the field of view, and which new NPCs appear, deletes the old NPCs that leave the field of view and creates new NPC entity objects, and notifies the client. After receiving a notification message, the client deletes old NPC entity objects and displays the new NPC entity objects.

The following first describes an NPC data precreator, an NPC data manager, an NPC data indexer, an NPC instantiator, and an NPC screener related in this embodiment of this disclosure, respectively.

(1) NPC Data Precreator

In some embodiments, gameplay in the open-world games is rich, so that quantities of the NPC generation rules and the NPC basic data are very large, numbering in thousands. If all the NPC generation rules and the NPC basic data are created in real time when the player registers for an account, a large amount of CPU time is consumed, and pressure of the server is increased, so that a number of registration concurrency is reduced, and game activity is affected. However, the NPC data precreator can precreate the basic data of all the NPCs in the game when the server starts up or is idle, and then use the basic data of all the NPCs during registration. This optimizes a registration procedure, and fully utilizes a capability of the server.

(2) NPC Data Manager

In some embodiments, generation of the NPC basic data may be solely responsible for the NPC data manager, and all the NPC generation rules configured by the planners are managed and implemented by the NPC data manager. The NPC generation rules include the generation rules corresponding to the NPCs with attributes that do not change and the generation rules corresponding to the NPCs with attributes that may change. For various generation rules corresponding to the NPCs with attributes that may change, the NPC data manager performs effective checks, and extracts the basic data of the NPC from the NPC generation rules when a trigger condition of the generation rule is met. In this case, only the basic data of the NPC is obtained, and instantiation creation of the NPC entity objects are not performed. Therefore, the process is short and fast, and memory usage of the data is also very small.

(3) NPC Data Indexer

To efficiently and fast retrieve the basic data of NPCs in a specified range from all the NPC basic data of the player-controlled character, an optimized octree may be used to index and manage the data. In this way, only a retrieval range needs to be specified, and an NPC basic data set (namely, the basic data of a plurality of NPCs appearing in the specified range) in the specified range can be obtained in a short time.

In some embodiments, the NPC may be distributed in a two-dimensional or three-dimensional space. To fast and effectively obtain the NPC basic data set according to a specified space range, the optimized octree structure may be used in the embodiments of this disclosure to establish an index according to a position of the NPC, to manage the NPC basic data. A node (namely, the intermediate node) between a root node and the leaf node provides a function of path query (index). This is also a process of refining an original large scene space. The NPC basic data belonging to the leaf node (namely, the subspace) is actually stored to a level of the leaf node, and positions of the NPCs are located in this region.

Figure 7:
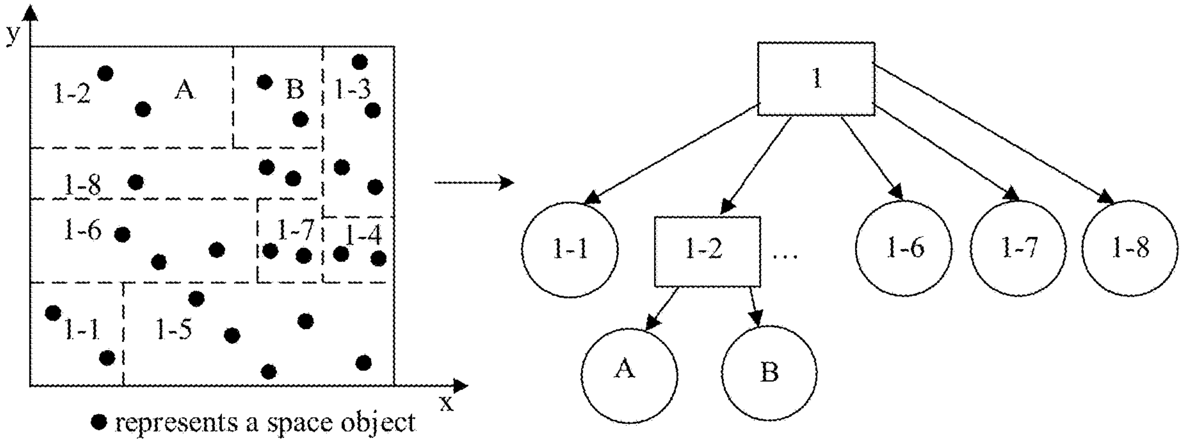
FIG. 7 is a schematic structural diagram of an octree according to an embodiment.

For example, FIG. 7 is a schematic structural diagram of an octree according to an embodiment of this disclosure. The octree structure shown in FIG. 7 has three layers. The NPC data indexer is an encapsulation of the octree structure shown in FIG. 7. Box nodes (for example, a node 1-2 and a node 1-6) shown in FIG. 7 are intermediate nodes, which mainly manage subordinate subspaces and provide a space index function, and do not store the NPC basic data. Circular nodes (for example, a node A and a node B) shown in FIG. 7 are leaf nodes, which manage the subspace of the leaf node, and stores the NPC basic data belonging to the subspace. In addition, if a data volume managed by a leaf node (for example, the node 1-2 shown in FIG. 7) exceeds a data volume threshold, the node 1-2 splits, and the subspace managed by the node 1-2 also splits into two, forming two new leaf nodes (for example, the node A and the node B). The NPC basic data managed by the node 1-2 is also delivered to the new created two leaf nodes for management, and the node 1-2 becomes a new intermediate node. In this way, by using the octree structure, and specifying a specific range, the NPC data indexer can all the NPC basic data in the range in logarithmic time, improving efficiency of managing the NPCs.

(4) NPC Instantiator

In some embodiments, creation of the NPC entity objects may be solely responsible for the NPC instantiator. For example, the NPC instantiator may use a range retrieval function provided by the NPC data indexer to quickly obtain the NPC basic data set in an AOI range. However, there may be a large number of NPCs in the AOI range, exceeding a display upper limit of the client. In other words, only a part of necessary NPCs need to be created without affecting the game experience of the player at all. This reduces the internal memory of the server, and can reduce the internal memory and traffic of the client. Therefore, the NPC instantiator may further introduce the NPC screener, and perform instantiation processing on a specific number of NPCs with high weights screened according to a set filtering rule, and delivers the created NPC entity objects to the client.

In some other embodiments, in the management of NPC basic data in multiple scenes, when the player controls a character to play in a scene A, it is possible that the generation rules in a scene B are also in effect, and according to the solution provided in the related art, NPC entity objects in both scenarios are generated at the same time. However, in the solution provided in the embodiments of this disclosure, since the player-controlled character is currently in the scene A, then instantiation processing is only performed on the NPCs in the scene A, and instantiation processing is not performed on the NPCs in the scene B. Instantiation processing is performed on the NPCs in the scene B when the player-controlled character subsequently moves to the scene B. In this way, through the two-stage process of the creation of the NPC entity objects, pre-generating and transmitting of unnecessary NPC entity objects can be avoided.

(5) NPC Screener

In some embodiments, the NPC screener can filter, according to a configured filtering policy, a plurality of NPCs appearing in a specified range, and can conveniently and flexibly load and unload the policy. For example, filtering may be performed by using policies such as a distance between the NPC and the player-controlled character (an NPC closer to the player-controlled character corresponding to a larger weight), NPC service importance (an NPC with greater importance corresponding to a larger weight), and whether the NPC has appeared in the field of view of the player-controlled character. Compared with an NPC that has not appeared in the field of view of the player-controlled character, the NPC that has appeared in the field of view of the player-controlled character corresponds to a larger weight. By using the NPC screener, an NPC set that is the most important to a current game process of the player can be effectively screened. In other words, with a combined effect of the NPC instantiator and the NPC screener, the number of NPC entity objects of each player can be effectively controlled in a proper range, which does not affect the game experience of the player, and reduces the internal memory and CPU consumption as well as the traffic of the server and terminal device.

In some other embodiments, since the game has a very clear time period concentration during operation, a number of players is very large during some time periods, and the server is under great pressure; and the number of players is very small during some time periods, and the server is very idle. To maintain the pressure of the server all at a stable level, in the embodiments of this disclosure, a load situation of the server can further be learned timely according to an interface provided by a server load detector, and a maximum number of NPC instantiations is adjusted in real time according to the load of the server. When the load of the server is higher than a set reference load, a value of the maximum number can be reduced; and when the load of the server is lower than the reference load, the value of the maximum number may be increased and kept at a preset value in most cases. In this way, the load of the server is fully balanced, the capability of the server is utilized, and the game experience of the player is not affected.

The data processing method for a virtual scene provided in the embodiments of this disclosure includes work division and cooperation of the above five modules. Each module only provides necessary interfaces, and shields implementation details, which can implement a complex generation, creation, and management system for the NPC entity objects. The system has high abstraction, reusability, and maintainability. If other modules need to introduce related functions, or functions of other modules need to be introduced, it is convenient for the other modules to access, with excellent scalability.

In other words, in the solution provided in the embodiments of this disclosure, the NPC data manager is responsible for generation of all the NPC basic data, and delivers the NPC basic data to the NPC data indexer for management. The NPC instantiator obtains the NPC basic data set in the specified range from the NPC data indexer. The NPC basic data set is filtered by the NPC screener to obtain a specific number of NPC basic data set that is the most important to the player. The NPC entity objects are created based on this, and are eventually delivered to the client. In addition, the maximum number of the instantiated NPCs can be adjusted in real time by detecting the load situation of the server.

The data processing method for a virtual scene provided in the embodiments of this disclosure is described in detail below.

Figure 8:
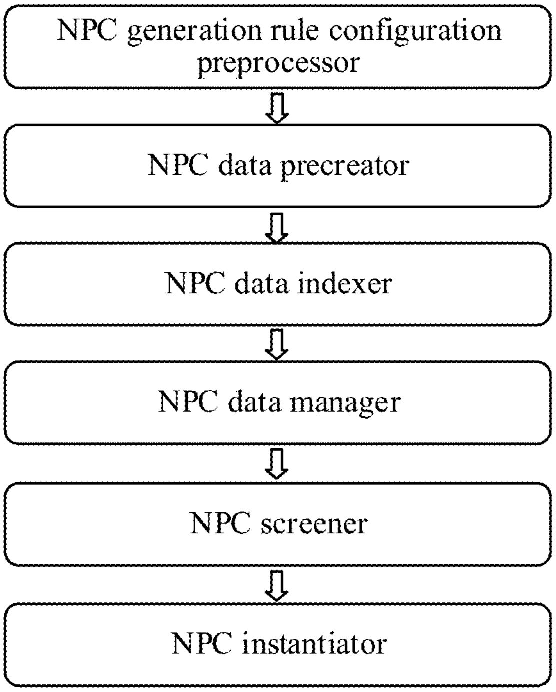
FIG. 8 is a schematic diagram of a principle of NPC generation and management according to an embodiment.

In some embodiments, FIG. 8 is a schematic diagram of a principle of NPC generation and management according to an embodiment of this disclosure. As shown in FIG. 8, the whole solution includes six layers, which are, respectively in a data flow direction, an NPC generation rule configuration preprocessor, responsible for classifying all the NPC generation rules configured by the planners; the NPC data precreator, responsible for creating complete NPC basic data when the server starts up or is idle, for use when the player registers, to avoid that real-time creation during registration consumes a large amount of time; the NPC data indexer, establishing a two-dimensional or three-dimensional index according to the position of the NPC, to fast find the NPC basic data set in the specified range; the NPC data manager, combining and managing the above three modules, and executing NPC generation; the NPC screener, responsible for screening a specific number of NPCs with weights ranked top for an NPC set in the specified range; and the NPC instantiator, responsible for creating the entity objects corresponding to the NPCs with high weights screened by the NPC screener, and managing AOI field of view data of the entity object. The following respectively describes each module in detail.

(1) NPC Generation Rule Configuration Preprocessor

In some embodiments, there are a large number of types of NPCs in an open-world game, and gameplay is rich. To generate the NPCs and implement related gameplay, there are also a large number of NPC generation rules, which may reach thousands. To avoid detecting whether each generation rule is triggered at all times, the solution provided in the embodiments of this disclosure classifies all the NPC generation rules. First, the NPC generation rules are divided into two categories. One category is generation rules corresponding to the NPC (for example, the guide NPC) that does not change any more after the basic data is generated. Such generation rules do not need to be detected by consuming time, and do not need to be stored in data of the player-controlled character. The second category is NPC generation rules constraint by the trigger condition, and needs to be stored in the data of the player-controlled character by the NPC data manager, or an identifier corresponding to the generation rule is stored, to avoid repeated storage.

For example, for the second category of generation rules, the NPC generation rule configuration preprocessor may further perform classification according to a specific trigger condition, for example, the level condition, and such generation rules only need to be detected when the level of the player-controlled character changes; and the time condition, classification is performed again according to time periods of all the NPC generation rules, and only a current time is in a specific time period, the NPC generation rule including this time period is detected. In this way, by classifying and detecting various types of generation rules according to the triggering condition of the generation rules, a size of the generation rule set to be detected can be effectively reduced, and the NPC generation rules can be precisely implemented, so that detection efficiency is improved, and resource consumption of the server is reduced.

(2) NPC Data Precreator

When the player registers, there is a large amount of data for initialization, including the NPC generation rules and a large amount of the NPC basic data, which need to be created and stored in the data of the player. Since there may be thousands of the NPC generation rules, there is also a large amount of NPC basic data generated by the NPC generation rules. These data are created in real time when the player registers, which is too inefficient and greatly affects player registration, resulting in low game registration concurrency.

For the above problems, the embodiments of this disclosure can use the NPC data precreator to precreate the NPC basic data required for the player registration, and directly retrieve the NPC basic data for the player to use when the player registers, instead of creating the NPC basic data in real time during registration. There are two main time points for precreation. The first is to perform precreation when the server starts. The second is to decide based on the load situation of the server. When the current load of the server is lower than the load threshold, precreation can be performed in case of need. The last guarantee scheme is that the basic data precreated during registration cannot cover all the basic data required for registration, then create the basic data in real time to ensure that players can register first.

(3) NPC Data Manager

The NPC data manager is a link part of the entire technical solution and is mainly responsible for organization and management of two parts of data. The first part is the NPC generation rules. Relevant generation rules are regularly detected. If the player-controlled character meets the trigger condition (for example, the level condition) in the generation rules, the corresponding generation rule is added to the NPC generation rule set (corresponding to the above rule database) already owned by the player-controlled character. Using the level condition as an example, when the level of the player-controlled character reaches a level threshold, the generation rule of the corresponding level can be unlocked, and the unlocked generation rule (or the identifier of the rule) is added to the NPC generation rule set owned by the player-controlled character. In addition, for the NPC generation rule owned by the player-controlled character, the NPC data manager regularly check the generation rule, and executes corresponding logic according to check result, including expired rule deletion and executing a hit NPC generation rule to generate the NPC basic data. The second part is the NPC basic data. According to game service requirements, the NPC basic data may be organized into different data sets based on various service dimensions, and can be conveniently accessed and used by other components and modules with the relevant interface provided by the NPC data manager.

(4) NPC Screener

A main function of the NPC screener is to select N NPCs with weights ranked top from the NPC basic data set for instantiation processing, to create corresponding NPC entity objects and deliver the entity objects to the client.

In some embodiments, an amount of the NPC basic data obtained through the NPC data indexer based on the AOI of the player-controlled character is very large, which is likely to be higher than an amount that can be displayed in a field of view of the client, and too much data puts great pressure on the server and the client. Therefore, to select the NPC that needs to be presented most, it is necessary to screen the plurality of NPCs that exist in the specified range. For example, the plurality of states of the NPCs that exist in the specified range may be quantified, and then weighted summation is performed on a plurality of quantized values obtained to obtain a final weight of each NPC, and finally the plurality of NPCs are sorted in descending order based on the weights, and the N NPCs located in a header range in a descending order result are selected. There are many dimensions for NPC status selection, and policies are complex. In addition, the dimensions are usually highly coupled with service requirements, such as a distance, a team, a friend, hatred, and a historical perspective. In addition, to improve portability, abstract packaging may also be performed. The dimensions only need to implement respective weight calculation policies, and there is no need to care about other aspects.

(5) NPC Instantiator

After the data generation and screening of the above components, a specified amount of the NPC basic data is finally obtained. These data are processed by the NPC instantiator to create the corresponding NPC entity object. Only the entity object has various functions required for the game, such as movement, interaction, combat, and exploded rewards. The NPC instantiator invokes a unified underlying interface to create the entity objects, and initializes the entity objects according to the NPC basic data. After the process is completed, the process is updated into the AOI field of view data of the player-controlled character, and is notified to the client.

In addition, as the game of the player progresses, the position and status of the player-controlled character may change, and the NPC instantiator responds promptly. The NPC instantiator continuously obtains the NPC basic data set in a current AOI from the NPC data manager through the interface, recreates newly appeared NPC entity objects in the current AOI after screening by the NPC screener, and seamlessly updates and switches the field of view of the player, to ensure the game experience of the player. In addition, the entity object in an old field of view is deleted, to release the internal memory and reduce traffic consumption. Certainly, before deletion, the status data of the entity object is stored into the corresponding NPC basic data, to be accurately created next time.

A data flow in the technical solution provided in the embodiments of this disclosure mainly includes four processes. The processes are connected in series through the NPC generation rules and the NPC basic data, and the series connection is implemented by a common interface, not involving implementation details of each data flow. Data processing and handling of each data flow is the main function of the above components, which has good cohesion and encapsulation. Different components connected in series by using interfaces can assemble all components like an assembly line, and implement required functions, which has good scalability.

Figure 9A:
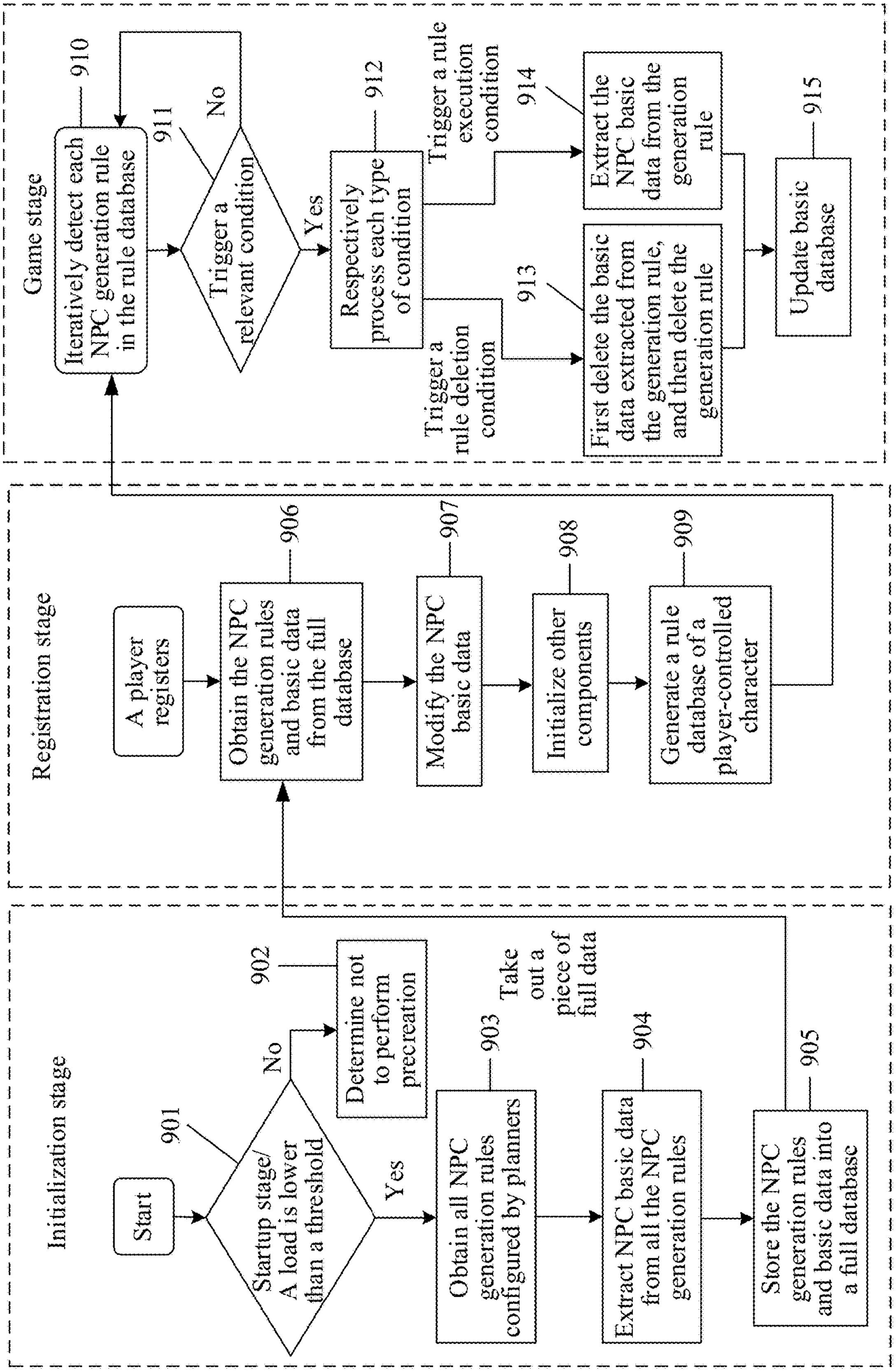
FIG. 9A and FIG. 9B are schematic flowcharts of a data processing method for a virtual scene according to an embodiment.

The following continues to describe the data processing method for a virtual scene provided in the embodiments of this disclosure referring to FIG. 9A. As shown in FIG. 9A, the data processing method for a virtual scene provided in the embodiments of this disclosure may be divided into three stages, which are an initialization stage, a registration stage, and a game stage, respectively. The initialization stage includes operation 901 to operation 905, the registration stage includes operation 906 to operation 909, and the game stage includes operation 910 to operation 915. The following first describes the initialization stage in detail.

Operation 901. Determine whether the server is in the startup stage or whether the load is lower than the threshold, if the server is not in the startup stage or the load is not lower than the threshold, perform operation 902; or if the server is in the startup stage or the load is lower than the threshold, perform operation 903.

Operation 902. The server determines not to perform precreation.

Operation 903. The server obtains all the NPC generation rules configured by the planners.

Operation 904. The server extracts the NPC basic data from all the NPC generation rules.

Operation 905. The server stores the NPC generation rules and basic data into the full database.

So far, the server completes the initialization of the NPC generation rule and basic data. The initialization stage ends, and the registration stage is entered. The following describes the registration stage in detail.

Operation 906. The server obtains the NPC generation rules and basic data from the full database.

In some embodiments, when detecting that a new player registers, the server can obtain, from the full database, all the NPC generation rules and the NPC basic data extracted from the NPC generation rules.

Operation 907. The server modifies the NPC basic data.

In some embodiments, the server may modify some fields of the NPC basic data according to the level of player during registration. For example, it is assumed that the level of the player-controlled character is level 1 during registration, the level included in the NPC basic data may also be modified to level 1, so that the level of the NPC adapts to the level of the player-controlled character, to improve the game experience of the player.

Operation 908. The server initializes other components.

The other components are components other than the above five components in the game, for example, including a component responsible for transaction in the game and a component responsible for combat between different game characters.

Operation 909. The server generates the rule database of the player-controlled character.

In some embodiments, the server may add, according to the current level of the player-controlled character, the generation rule meeting the level condition in all the NPC generation rules to the NPC generation rule set owned by the player, to obtain the rule database of the player-controlled character. For example, it is assumed that the level of the player-controlled character is level 1, the generation rule corresponding to the NPC of level 1 in all the NPC generation rules may be used as a currently unlocked generation rule of the player, and added to the NPC generation rule set owned by the player.

So far, the player registration ends, the registration stage ends, and the game stage is entered. The following describes the game stage in detail.

Operation 910. The server iteratively detects each NPC generation rule in the rule database.

Operation 911. The server determines whether a relevant condition is triggered, if the relevant condition is triggered, operation 912 is performed; or if the relevant condition is not triggered, operation 910 is performed.

Operation 912. The server respectively processes each type of condition, and performs operation 913 when it is determined that the rule deletion condition is triggered; and performs operation 914 when it is determined that the rule execution condition is triggered.

Operation 913. The server first deletes the basic data extracted from the generation rule, and then deletes the generation rule.

In some embodiments, when detecting that an NPC generation rule in the rule database is expired (that is, the rule deletion condition is triggered), the server can delete, from the basic database, the basic data extracted from the generation rule, and delete the generation rule from the rule database.

Operation 914. The server extracts the NPC basic data from the generation rule.

Operation 915. The server updates the basic database.

In some embodiments, when detecting that the rule execution condition included in an NPC generation rule in the rule database is met, the server can extract new NPC basic data from the NPC generation rule, and replace original NPC basic data extracted from the NPC generation rule and stored in the basic database with the new NPC basic data, to implement updating of the basic database.

Figure 9B:
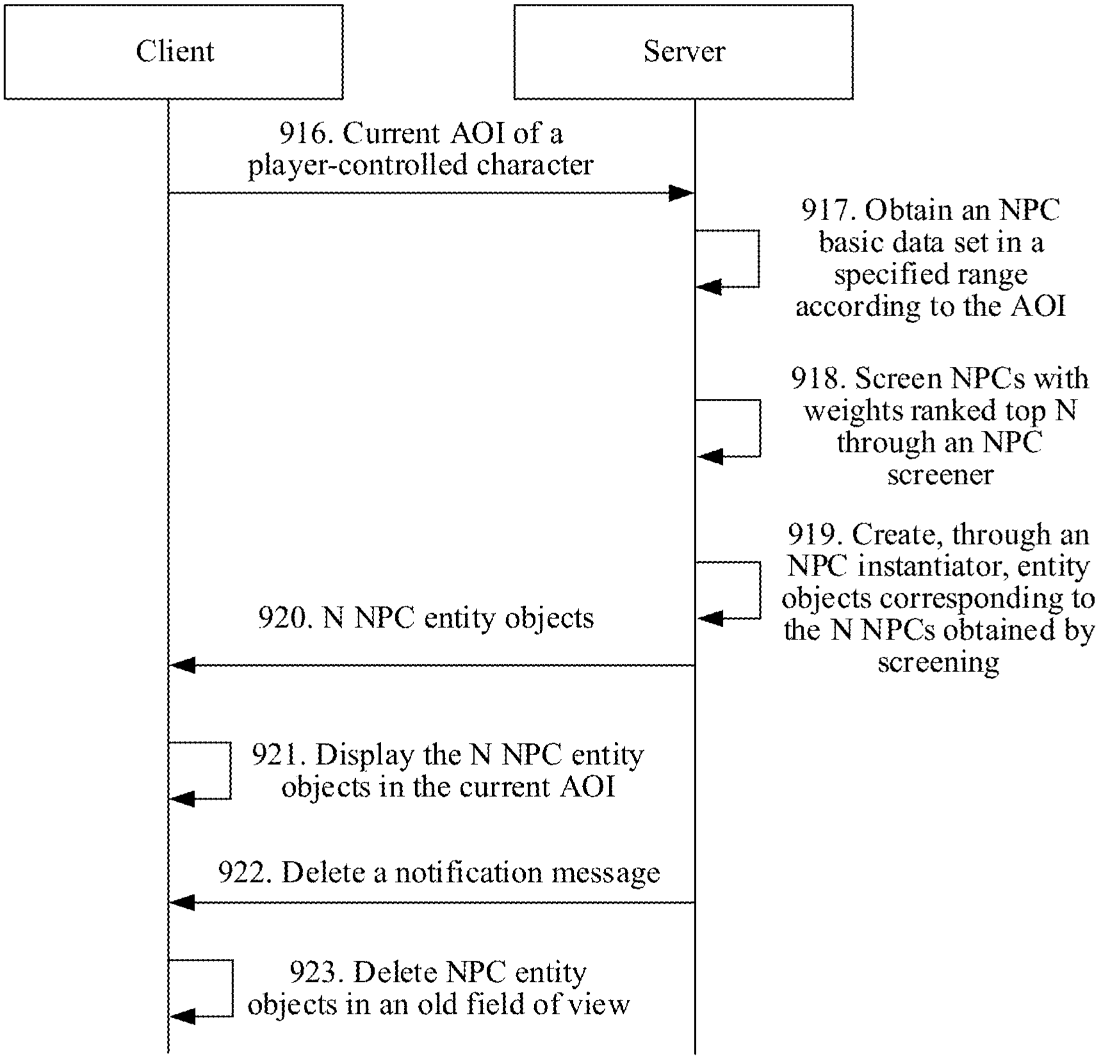

The following continues to describe a creation process of the NPC entity object with reference to FIG. 9B.

For example, FIG. 9B is a schematic flowchart of a data processing method for a virtual scene according to an embodiment of this disclosure. Operations shown in FIG. 9B is used for description.

Operation 916. The client transmits the current AOI of the player-controlled character to the server.

Operation 917. The server obtains the NPC basic data set in the specified range according to the AOI.

In some embodiments, the client may report the current AOI of the player-controlled character in the open world in real time to the server, so that the server invokes, according to the current AOI of the player-controlled character, the NPC data indexer to obtain the NPC basic data set in the specified range (that is, the current AOI).

Operation 918. The server screens NPCs with weights ranked top N through the NPC screener.

Operation 919. The server creates, through the NPC instantiator, the entity objects corresponding to the N NPCs obtained by screening.

Operation 920. The server transmits N NPC entity objects to the client.

Operation 921. The client displays the N entity objects in the current AOI.

In some embodiments, after receiving the N entity objects transmitted by the server, the client can display newly appeared N entity objects in the current AOI of the player-controlled character.

Operation 922. The server transmits a deletion notification message to the client.

Operation 923. The client deletes NPC entity objects in the old field of view.

In a process in which the player-controlled character moves in the open world, operation 916 to operation 923 are repeatedly performed. To be specific, when detecting that a distance of the player-controlled character moving in the open world is greater than ad distance threshold, the server can notify the client of a field of view change of the player-controlled character efficiently in real time, and seamless update and switch the field of view of the player-controlled character, to ensure the game experience of the player. In addition, after the NPC entity objects in the old field of view are deleted, the internal memory can be released, and the traffic consumption is reduced.

In some embodiments, after downloading the game, the player opens the game client for registration, and new account data starts initialization. When the initialization comes to the NPC basic data, the related component takes out a piece of NPC basic data that is preprocessed from a precreated NPC full data list and directly provides the piece of NPC basic data for the player. A registration process is greatly improved without initialization operation of an entire large amount of data.

After the player registers and enters the game, the server selects a batch of NPCs with the highest weights according to the AOI of the player-controlled character, then instantiates the NPC obtained by screening, to obtain corresponding NPC entity objects, and delivers the NPC entity objects to the client for display. As the player-controlled character moves, the client continuously reports the current position of the player-controlled character in the open world. When detecting the position of the player-controlled character moves to a threshold, the server triggers update of the AOI of the player-controlled character. For example, the server may select a batch of NPCs with the highest weights in the current AOI for instantiation processing, to obtain an object set B, and performs difference set calculation on the object set B and an object set A in the old AOI. An entity object in an intersection between the set A and the set B is an NPC entity object exists before and after the field of view changes, and is reserved without any processing. An object in the set B but not in the set A belongs to NPC entity objects that newly enters the field of view, and the server delivers related data to the client for display. An object not in the set B but in the set A is an NPC entity object in the old AOI, the server notifies the client to delete the object. Through such processing, the server can efficiently notify the client of the field of view changes of the player-controlled character in real time.

Figure 10:
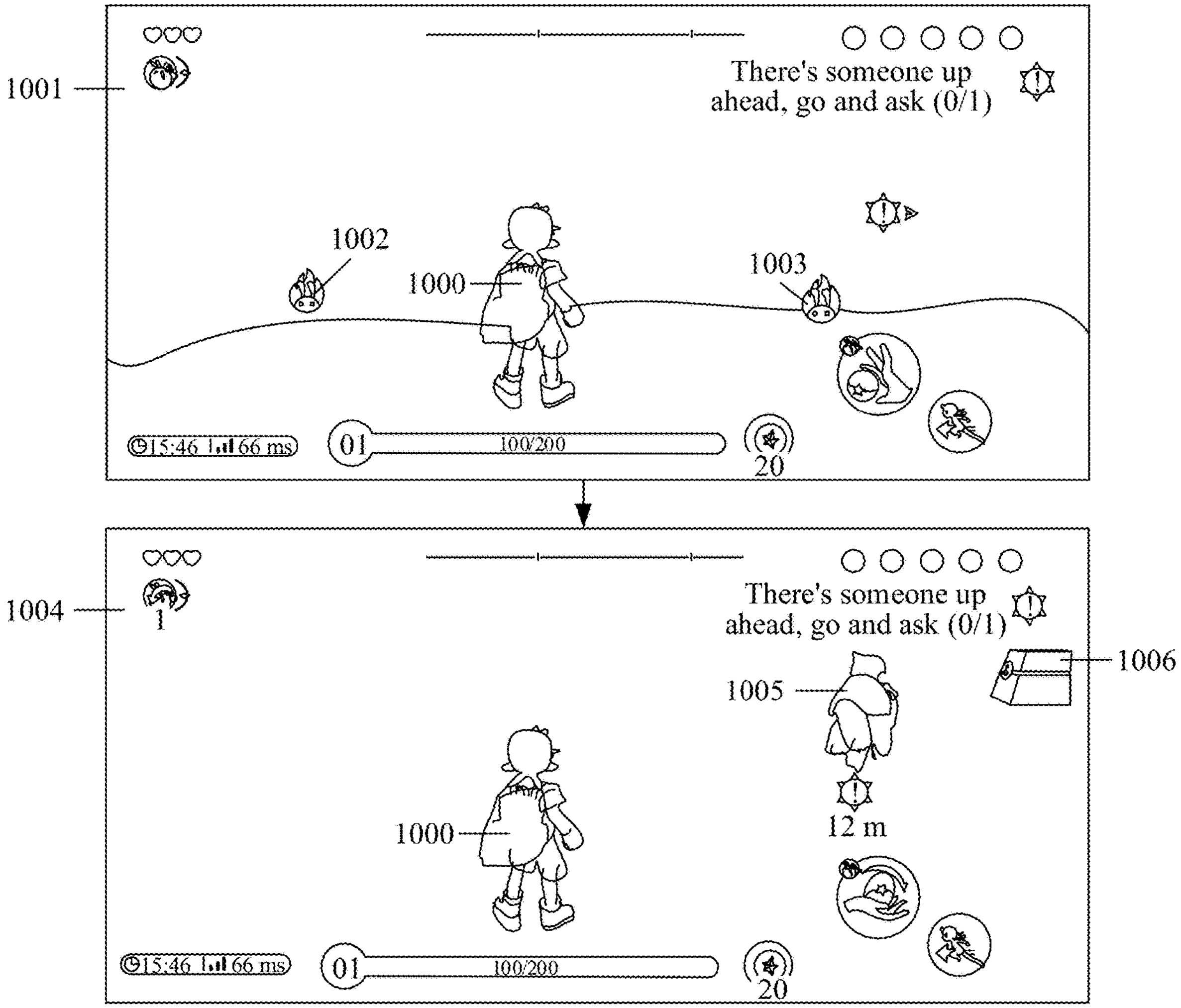
FIG. 10 is a schematic diagram of an application scenario of a data processing method for a virtual scene according to an embodiment.

For example, FIG. 10 is a schematic diagram of an application scenario of a data processing method for a virtual scene according to an embodiment of this disclosure. As shown in FIG. 10, after the player registers and enters the game, a batch of NPC entity objects, for example, including a seed monster 1002 and a stone monster 1003, with the highest weights are displayed in a field of view range 1001 of the player-controlled character (namely, a player-controlled character 1000). Then after the player-controlled character 1000 moves around a registration place, the field of view changes. Two new NPC entity objects appear in a new field of view range 1004, for example, a person in black 1005 and a black box 1006 the person guards.

Based on the foregoing, the data processing method for a virtual scene provided in the embodiments of this disclosure has the following beneficial effects.

(1) For all the NPC generation rules, the solution provided in the embodiments of this disclosure performs beneficial classification, and adopts corresponding processing policies for different types of generation rules. For example, generation rules exist and take effect at the beginning of the registration of the player are not necessary to be stored, the NPC basic data can be directly extracted from the generation rule, and the generation rules do not need iterative detection subsequently. Generation rules that need to be detected are classified again according to different trigger conditions, so that precise and efficient detection is implemented, use of the internal memory of the server is reduced, and detection processing efficiency is improved.

(2) The NPC generation rules and the NPC basic data are extremely important data of the player. To improve registration efficiency, and reduce a registration delay, for this part of data, in the embodiments of this disclosure, the server creates an amount of NPC basic data for temporary storage when the server is idle, for direct use during registration, but not create the NPC basic data in real time. This effectively utilizes computing power of the server, and prevents the server from being very idle sometimes and being very busy sometimes, keeping CPU consumption of the server stable.

(3) A policy that the number of NPC entity objects in the AOI of the player-controlled character is limited but does not affect the game experience of the player is adopted, with an aim of reducing the internal memory usage of the server and CPU processing pressure, as well as reducing the traffic consumption and processing burden of the client. To achieve this purpose, the NPC instantiator obtains the NPC basic data set in the AOI from the NPC data manager, and obtains the basic data of the N NPCs with the weights ranked top through the NPC screener, and then performs instantiation processing to create corresponding entity objects.

(4) Each data flow process is encapsulated into a component, and has high cohesion, providing necessary data access interfaces to the outside, which implements required functions like building blocks, and has good scalability and maintainability.

The following continues to describe the data processing apparatus 243 for a virtual scene provided in the embodiments of this disclosure. In some embodiments, as shown in FIG. 2, software modules of the data processing apparatus 243 for a virtual scene stored in the memory 240 may include: the NPC data manager 2431, the NPC data indexer 2432, the NPC screener 2433, and the NPC instantiator 2434.

The NPC data manager 2431 is configured to obtain a current position of a player-controlled character in a virtual scene, and determine a current query range including the current position. The NPC data indexer 2432 is configured to query, from a basic database according to the current query range, basic data respectively corresponding to a plurality of NPCs to be generated in the current query range, the basic data of each NPC including a plurality of attributes configured for performing instantiation processing on the NPC. The NPC screener 2433 is configured to determine weights of the plurality of NPCs, and determine a descending order result of the weights of the plurality of NPCs. The NPC instantiator 2434 is configured to perform instantiation processing on a first number of NPCs starting from the first NPC in the descending order result, to obtain a first number of entity objects respectively corresponding to the first number of NPCs, the first number being less than a total number of the plurality of NPCs; and transmit the first number of entity objects to a client controlling the player-controlled character, to cause the client to display, in the current query range, virtual images corresponding to the first number of NPCs.

In some embodiments, the NPC screener 2433 is further configured to perform the following processing for each NPC: performing quantification processing on a status of at least one dimension of the NPC, to obtain at least one quantized value; determining, when the at least one quantized value includes one quantized value, the quantized value as a weight of the NPC; and performing, when the at least one quantized value includes a plurality of quantized values, weighted summation on a plurality of quantized values, and determining an obtained weighted summation result as the weight of the NPC.

In some embodiments, the NPC screener 2433 is further configured to adjust, according to a type of a region to which the current query range belongs, the weights of the plurality of NPCs in an adjustment mode corresponding to the type; and determining at least one NPC with a weight exceeding a weight threshold in the plurality of adjusted NPCs as the first number of NPCs.

In some embodiments, the first number is dynamically determined according to a load of a server. The NPC instantiator 2434 is further configured to determine the first number by performing one of the following processing: comparing a current load of the server with a set reference load, the reference load being calibrated through a preset value; and increasing the preset value by a preset amplitude or ratio when the load is lower than the reference load, and determining the increased preset value as the first number; and reducing the preset value by a preset amplitude or ratio when the load is higher than the reference load, and determining the reduced preset value as the first number; or determining a range in which the current load of the server is located in a plurality of preset reference load ranges, and determining an instantiation number corresponding to the range as the first number, different reference load ranges corresponding to different instantiation numbers.

In some embodiments, the basic database stores basic data of all NPCs in the virtual scene through a multiway tree structure. The multiway tree structure includes: one top-level node, representing the virtual scene; a plurality of intermediate nodes, each intermediate node representing one space in the virtual scene, the space including indexes of a plurality of subordinate subspaces; and a plurality of leaf nodes, each leaf node representing one subspace in the intermediate node to which the leaf node belongs, the subspace including basic data of a NPC in the subspace. The NPC screener 2433 is further configured to query the multiway trec structure according to the current query range, to obtain at least one intermediate node covered by the current query range in the multiway tree structure; and query each leaf node included in each covered intermediate node, and use queried basic data respectively corresponding to a plurality of NPCs as the basic data respectively corresponding to the plurality of NPCs to be generated in the current query range.

In some embodiments, the basic data of the NPC is extracted from a generation rule of the NPC. Types of the generation rule include a static generation rule and a dynamic generation rule, and the dynamic generation rule is stored in a rule database. The NPC data manager 2431 is further configured to delete, from the basic database in response to expiration of any dynamic generation rule in the rule database, basic data extracted from the any dynamic generation rule; and merge a plurality of subspaces into one leaf node, in response to at least a part of basic data in a plurality of subspaces represented by any intermediate node being deleted, and a data volume of remaining basic data in the plurality of subspaces is less than a data volume threshold.

In some embodiments, the basic data of the NPC is extracted from a generation rule of the NPC. Types of the generation rule include a static generation rule and a dynamic generation rule, and the dynamic generation rule is stored in a rule database. The NPC data manager 2431 is further configured to extract, in response to any rule execution condition included in any dynamic generation rule in the rule database being met, the basic data corresponding to the NPC from the any dynamic generation rule; store the extracted basic data of the NPC into a target leaf node in the multiway tree structure, the extracted basic data of the NPC including a position of the NPC, and the position of the NPC belonging to a subspace of the target leaf node; and convert the target leaf node into a new intermediate node in response to a data volume of the target leaf node reaching (being greater than or equal to) a data volume threshold, and transfer the basic data stored in the target leaf node to two new subordinate leaf nodes of the new intermediate node.

In some embodiments, the NPC instantiator 2434 is further configured to compare the current query range with a historical query range, the historical query range being a query range including a historical position, the historical position being a position at which the player-controlled character is located before the current position in the virtual scene; and is configured to perform, in response to the current query range being completely different from the historical query range, the process of transmitting the first number of entity objects to the client controlling the player-controlled character. The NPC instantiator 2434 is further configured to transmit, in response to existence of an intersection region between the current query range and the historical query range, an entity object corresponding to another NPC to the client controlling the player-controlled character, the another NPC being a NPC that is in the first number of NPCs and that is located outside the intersection region, to cause the client to continue to display a virtual image corresponding to a NPC in the intersection region and a virtual image corresponding to a NPC in another region, the another region being a region other than the intersection region in the current query range; and is configured to transmit, in response to existence of a difference region in the historical query range compared with the current query range, a notification message to the client controlling the player-controlled character, the notification message being configured for notifying the client to delete an entity object corresponding to a NPC in the difference region.

In some embodiments, the NPC data manager 2431 is further configured to perform the following processing for each NPC located in the difference region: adding a new field in the basic database, and storing status data of the entity object corresponding to the NPC into the new field.

In some embodiments, the NPC instantiator 2434 is further configured to transmit an entity object of another NPC to the client in response to the player-controlled character returning to the current query range after leaving the current query range, the NPC being a NPC other than the first number of NPCs in the current query range.

In some embodiments, the NPC data manager 2431 is further configured to determine a field of view of a first-person perspective or a third-person perspective based on the current position as the current query range including the current position; or is configured to determine a geometric region of a set size centered on the current position as the current query range including the current position.

In some embodiments, the basic database stores the basic data of each NPC. The rule database stores generation rules corresponding to all the NPCs, and types of the generation rules are all dynamic generation rules. The dynamic generation rule is a generation rule of a NPC with a dynamically changing attribute. Each dynamic generation rule includes a plurality of rule execution conditions, and when different rule execution conditions are met, basic data extracted from the dynamic generation rule is different. The NPC data manager 2431 is further configured to update the basic database in the following manner: performing an expiration check on each dynamic generation rule stored in the rule database; deleting, from the basic database in response to an occurrence of an expired dynamic generation rule in the rule database, basic data extracted from the expired dynamic generation rule, and deleting the expired dynamic generation rule from the rule database; and extracting, in response to a rule execution condition included in any dynamic generation rule in the rule database being met, new basic data from the any dynamic generation rule, and replacing original basic data corresponding to the any dynamic generation rule in the basic database with the new basic data.

In some embodiments, each dynamic generation rule further includes an unlocking condition. The NPC data manager 2431 is further configured to update the rule database in the following manner: using, in response to any dynamic generation rule in the rule database meeting a rule deletion condition, the any dynamic generation rule as an expired dynamic generation rule, and deleting the expired dynamic generation rule from the rule database; and storing, in response to an unlocking condition included in any dynamic generation rule in a full database being met, the any dynamic generation rule into the rule database.

In some embodiments, the data processing apparatus 243 for a virtual scene further includes an NPC data precreator 2435, configured to initialize the rule database and the basic database in the following manner in a registration stage of the player-controlled character: obtaining all generation rules from the full database; classifying all the generation rules into static generation rules and dynamic generation rules, the static generation rules being generation rules of a NPC with a fixed attribute, and the dynamic generation rules being generation rules of a NPC with a dynamically changing attribute; extracting basic data corresponding to the NPC with the fixed attribute from the static generation rules, extracting basic data corresponding to the NPC with a dynamically changing attribute from the dynamic generation rules, and storing the extracted basic data into the basic database; and storing the dynamic generation rules into the rule database.

In some embodiments, the data processing apparatus 243 for a virtual scene further includes an NPC generation rule configuration preprocessor 2436, configured to initialize the full database in the following manner: obtaining, in an initialization stage, all generation rules configured for the virtual scene, the initialization stage including at least one of the following: a startup stage of the server and a stage in which the load of the server is lower than a load threshold; determining, based on all the generation rules, a type of a NPC that needs to be generated in the virtual scene; and extracting basic data of each NPC of the type from all the generation rules, and storing the extracted basic data and all the generation rules into the full database.

In some embodiments, the NPC instantiator 2434 is further configured to allocate a storage area in an internal memory space; and generate the entity objects respectively corresponding to the first number of NPCs in the storage area, the entity object including a variable representing an attribute of the NPC.

Descriptions of the apparatus in the embodiments of this disclosure are similar to the descriptions of the method embodiments, and have beneficial effects similar to those of the method embodiments. Therefore, details are not repeated. Technical details not mentioned in the data processing apparatus for a virtual scene provided in the embodiments of this disclosure may be understood according to description of any one of FIG. 3 or FIG. 5.

An embodiment of this disclosure provides a computer program product. The computer program product includes computer-executable instructions, and the computer program or the computer-executable instructions are stored in a computer-readable storage medium. A processor of a computer device reads the computer-executable instructions from the computer-readable storage medium. The processor executes the computer-executable instructions, to cause the computer device to perform the data processing method for a virtual scene in the embodiments of this disclosure.

An embodiment of this disclosure provides a computer-readable storage medium having computer-executable instructions stored therein. When executed by a processor, the computer-executable instructions cause the processor to perform the data processing method for a virtual scene, for example, the data processing method for a virtual scene shown in FIG. 3 or FIG. 5, provided in the embodiments of this disclosure.

In some embodiments, the computer-readable storage medium may be a memory such as an FRAM, a ROM, a PROM, an EPROM, an EEPROM, a flash memory, a magnetic surface memory, an optical disk, or a CD-ROM, or may be any device including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the executable instructions may be deployed to be executed on an electronic device, or deployed to be executed on a plurality of electronic devices at the same location, or deployed to be executed on a plurality of electronic devices that are distributed in a plurality of locations and interconnected by using a communication network.

The foregoing disclosure includes some embodiments of this disclosure which, are not intended to limit the scope of this disclosure. Other embodiments shall also fall within the scope of this disclosure.

What is claimed is:

1. A data processing method, comprising:

determining a current query range based on current position information of a character controlled by a user in a virtual scene;

determining NPC attribute data for a plurality of candidate non-player characters (NPCs) from a database to be placed in the current query range, wherein the NPC attribute data includes a plurality of attributes respectively corresponding to each of the plurality of candidate NPCs;

determining, by processing circuitry, weights for each of the plurality of candidate NPCs based on NPC status information;

selecting, from the NPC attribute data, first NPC attribute data corresponding to a first number of candidate NPCs based on a descending order of the weights for each of the plurality of candidate NPCs, wherein the first number of candidate NPCs is less than a total number of the plurality of candidate NPCs;

generating NPC entity objects corresponding to the first number of candidate NPCs based on the first NPC attribute data, the attribute data of each of the NPC entity objects including a variable representing an attribute of a corresponding candidate NPC of the respective NPC entity object; and transmitting the NPC entity objects to a client controlling the character, to cause the client to display, in the current query range, virtual images of the NPC entity objects corresponding to the first number of candidate NPCs.

2. The method according to claim 1, wherein the determining the weights for each of the plurality of candidate NPCs comprises:

determining at least one quantized value corresponding to at least one piece of the status information for each of the candidate NPCs, wherein when the at least one quantized value consists of one quantized value, the quantized value is the weight of the candidate NPC; or when the at least one quantized value comprises a plurality of quantized values, the weight of the candidate NPC is a weighted summation based on the plurality of quantized values.

3. The method according to claim 1, further comprising:

adjusting the weights of the plurality of candidate NPCs based on a type of a region in the current query range; and determining at least one of the candidate NPCs with a weight exceeding a weight threshold in the plurality of candidate NPCs as the first number of candidate NPCs.

4. The method according to claim 1, wherein the first number of candidate NPCs is determined by one of:

determining the first number of candidate NPCs based on a comparison between a current load of a server and a set reference load of the server, the reference load being calibrated through a preset value, wherein when the current load of the server is lower than the reference load, increasing the preset value by a preset amplitude or ratio, and determining the increased preset value as the first number of candidate NPCs; and when the current load of the server is higher than the reference load, reducing the preset value by the preset amplitude or ratio, and determining the reduced preset value as the first number of candidate NPCs; or determining the first number of candidate NPCs based on an instantiation number corresponding to a range in which the current load of the server is located in a plurality of preset reference load ranges, wherein different reference load ranges correspond to different instantiation numbers.

5. The method according to claim 1, wherein the database stores NPC attribute data of NPCs in the virtual scene through a multiway tree structure, the multiway tree structure includes one top-level node, representing the virtual scene;

a plurality of intermediate nodes, each intermediate node representing one space in the virtual scene, the space including indexes of a plurality of subordinate subspaces; and a plurality of leaf nodes, each leaf node representing one subspace in the intermediate node to which the leaf node belongs, the subspace comprising NPC attribute data of an NPC in the subspace; and the method further comprises:

querying the multiway tree structure based on the current query range, to obtain at least one of the intermediate nodes within the current query range in the multiway tree structure; and querying each leaf node belonging to each of the at least one of the intermediate nodes within the current query range, queried NPC attribute data respectively corresponding to a plurality of NPCs being used as the NPC attribute data for the plurality of candidate NPCs.

6. The method according to claim 5, wherein the NPC attribute data of the NPCs is extracted from a plurality of generation rules of the NPCs, the generation rules include static generation rules and dynamic generation rules, and the dynamic generation rules are stored in a rule database; and the method further comprises:

deleting NPC attribute data extracted from a plurality of the dynamic generation rules from the database when the dynamic generation rules are expired in the rule database; and merging a plurality of subspaces into one leaf node when at least one of the NPC attribute data in the plurality of subspaces represented by an intermediate node is deleted, and a data volume of remaining NPC attribute data in the plurality of subspaces is less than a data volume threshold.

7. The method according to claim 6, further comprising:

extracting the NPC attribute data corresponding to the NPCs from the dynamic generation rules when at least one of rule execution conditions included in at least one of the dynamic generation rules in the rule database is met;

storing the extracted NPC attribute data of the NPCs into at least one of target leaf nodes in the multiway tree structure, the extracted NPC attribute data of the NPCs including at least one position of the NPCs, and the at least one position of the NPCs belonging to at least one subspace of the target leaf nodes;

converting the at least one of the target leaf nodes into a new intermediate node in response to the data volume of the target leaf node reaching the data volume threshold; and transferring the NPC attribute data stored in the at least one of the target leaf nodes to two new subordinate leaf nodes of the new intermediate node.

8. The method according to claim 6, wherein the database stores the NPC attribute data of each of the NPCs;

the rule database stores the dynamic generation rules corresponding to the NPCs, each dynamic generation rule includes a plurality of rule execution conditions, and provides different NPC attribute data extracted from the dynamic generation rules when different rule execution conditions are met, and the method further comprises:

performing an expiration check on each of the dynamic generation rules stored in the rule database;

deleting NPC attribute data extracted from the expired dynamic generation rule in the database and deleting the corresponding expired dynamic generation rule from the rule database when an expired dynamic generation rule is found; and extracting new NPC attribute data from at least one of the dynamic generation rules and replacing original NPC attribute data corresponding to at least one of the dynamic generation rules in the database with the new NPC attribute data when at least one of the rule execution conditions is met.

9. The method according to claim 8, wherein each of the dynamic generation rules includes an unlocking condition; and the method further comprises:

determining the at least one of the dynamic generation rule as the expired dynamic generation rule when a rule deletion condition is met, and deleting the expired dynamic generation rule from the rule database; and storing the at least one of the dynamic generation rule into the rule database when the unlocking condition included in the at least one of the dynamic generation rule in a full database is met.

10. The method according to claim 9, further comprising:

obtaining the generation rules for the virtual scene in an initialization stage, the initialization stage including at least one of a startup stage of a server and a stage when a load of the server is lower than a load threshold;

determining, based on the generation rules, NPC types to be generated in the virtual scene; and extracting NPC attribute data of each of the NPC types from the generation rules, and storing the extracted NPC attribute data and the generation rules into the full database.

11. The method according to claim 8, further comprising:

obtaining the generation rules from a full database;

classifying the generation rules into the static generation rules and the dynamic generation rules, the static generation rules are the generation rules of the NPCs with fixed attributes, and the dynamic generation rules are the generation rules of the NPCs with dynamically changing attributes;

extracting NPC attribute data corresponding to the NPCs with the fixed attributes from the static generation rules, extracting NPC attribute data corresponding to the NPCs with the dynamically changing attributes from the dynamic generation rules, and storing the extracted NPC attribute data into the database; and storing the dynamic generation rules into the rule database.

12. The method according to claim 1, further comprising:

comparing the current query range with a historical query range, the historical query range being a query range that includes a historical position, the historical position being a position at which the character controlled by the user is located before the current position in the virtual scene;

transmitting the NPC entity objects generated to the client when the current query range does not overlap and is entirely outside of the historical query range;

transmitting a subset of the NPC entity objects to the client when an intersection region exists between the current query range and the historical query range, the subset of the NPC entity objects corresponding to candidate NPCs located outside of the intersection region, to cause the client to continue to display virtual images corresponding to candidate NPCs in the intersection region and the virtual images corresponding to candidate NPCs in another region, the another region being the region other than the intersection region in the current query range; and transmitting a notification message to the client to delete the NPC entity objects corresponding to candidate NPCs in a difference region, the difference region being a region in the historical query range that is outside the current query range.

13. The method according to claim 12 further comprising:

adding a new field for each of the candidate NPCs in the difference region in the database, and storing status data of the NPC entity objects corresponding to candidate NPCs in the difference region into the new field.

14. The method according to claim 1, further comprising:

transmitting the NPC entity objects corresponding to other candidate NPCs to the client when the character controlled by the user returns to the current query range after leaving the current query range, the other candidate NPCs being candidate NPCs other than the first number of candidate NPCs in the current query range.

15. The method according to claim 1, wherein the determining the current query range based on the current position information comprises one of:

determining the current query range based on a field of view of a first-person perspective or a third-person perspective based on the current position information; or determining the current query range based on a geometric area of a predetermined size centered on the current position information.

16. The method according to claim 1, wherein the generating the NPC entity objects comprises:

allocating a storage area in an internal memory space; and generating the NPC entity objects in the storage area.

17. A data processing apparatus, comprising:

processing circuitry configured to:

determine a current query range based on current position information of a character controlled by a user in a virtual scene;

determine NPC attribute data for a plurality of candidate non-player characters (NPCs) from a database to be placed in the current query range, wherein the NPC attribute data includes a plurality of attributes respectively corresponding to each of the plurality of candidate NPCs;

determine weights for each of the plurality of candidate NPCs based on NPC status information;

select, from the NPC attribute data, first NPC attribute data corresponding to a first number of candidate NPCs based on a descending order of the weights for each of the plurality of candidate NPCs, wherein the first number of candidate NPCs is less than a total number of the plurality of candidate NPCs;

generate NPC entity objects corresponding to the first number of candidate NPCs based on the first NPC attribute data, the attribute data of each of the NPC entity objects including a variable representing an attribute of a corresponding candidate NPC of the respective NPC entity object; and transmit the NPC entity objects to a client controlling the character, to cause the client to display, in the current query range, virtual images of the NPC entity objects corresponding to the first number of candidate NPCs.

18. The data processing apparatus according to claim 17, wherein the processing circuitry is configured to:

determine at least one quantized value corresponding to the status information for each of the candidate NPCs, wherein when the at least one quantized value consists of one quantized value, the quantized value is the weight of the candidate NPC; or when the at least one quantized value comprises a plurality of quantized values, the weight of the candidate NPC is a weighted summation based on the plurality of quantized values.

19. The data processing apparatus according to claim 17, wherein the processing circuitry is configured to:

adjust the weights of the plurality of candidate NPCs based on a type of a region in the current query range; and determine at least one of the candidate NPCs with a weight exceeding a weight threshold in the plurality of candidate NPCs as the first number of candidate NPCs.

20. A non-transitory computer-readable storage medium storing instructions which, when executed by a processor, cause the processor to perform:

determining a current query range based on current position information of a character controlled by a user in a virtual scene;

determining NPC attribute data for a plurality of candidate non-player characters (NPCs) from a database to be placed in the current query range, wherein the NPC attribute data includes a plurality of attributes respectively corresponding to each of the plurality of candidate NPCs;

determining weights for each of the plurality of candidate NPCs based on NPC status information;

selecting, from the NPC attribute data, first NPC attribute data corresponding to a first number of candidate NPCs based on a descending order of the weights for each of the plurality of candidate NPCs, wherein the first number of candidate NPCs is less than a total number of the plurality of candidate NPCs;

generating NPC entity objects corresponding to the first number of candidate NPCs based on the first NPC attribute data, the attribute data of each of the NPC entity objects including a variable representing an attribute of a corresponding candidate NPC of the respective NPC entity object; and transmitting the NPC entity objects to a client controlling the character, to cause the client to display, in the current query range, virtual images of the NPC entity objects corresponding to the first number of candidate NPCs.

* * * * *